United States Patent [19]

Boller et al.

[11] Patent Number: 4,613,208
[45] Date of Patent: Sep. 23, 1986

[54] COLORING SUBSTANCE-CONTAINING LIQUID CRYSTAL MIXTURES

[75] Inventors: Arthur Boller, Binningen; Alfred Germann, Basel; Martin Petrzilka, Kaiseraugst; Martin Schadt, Seltisberg, all of Switzerland

[73] Assignee: Hoffmann-La Roche Inc., Nutley, N.J.

[21] Appl. No.: 553,202

[22] Filed: Nov. 18, 1983

[30] Foreign Application Priority Data

Nov. 29, 1982 [CH] Switzerland .................. 6923/82
Sep. 30, 1983 [CH] Switzerland .................. 5303/83

[51] Int. Cl.$^4$ .................... G02F 1/13; C09K 3/34
[52] U.S. Cl. ....................... 350/349; 252/299.1
[58] Field of Search .......... 252/299.1, 299.63, 299.6, 252/299.66, 299.64, 299.61, 299.65; 350/349

[56] References Cited

U.S. PATENT DOCUMENTS

| | | | |
|---|---|---|---|
| 4,145,114 | 3/1979 | Coates et al. | 252/299.1 |
| 4,273,929 | 6/1981 | Boller et al. | 252/299.1 |
| 4,279,770 | 7/1981 | Imukai et al. | 252/299.64 |
| 4,368,135 | 1/1983 | Osman | 252/299.63 |
| 4,393,258 | 7/1983 | Sato et al. | 252/299.63 |
| 4,395,350 | 7/1983 | Boller et al. | 252/299.61 |
| 4,400,293 | 8/1983 | Romer et al. | 252/299.63 |
| 4,402,854 | 9/1983 | Moeller et al. | 252/299.1 |
| 4,439,015 | 3/1984 | Rich et al. | 252/299.62 |
| 4,460,770 | 7/1984 | Petrzilka et al. | 252/299.63 |
| 4,479,885 | 10/1984 | Mukoh et al. | 252/299.62 |
| 4,483,593 | 11/1984 | Imazeki et al. | 252/299.1 |
| 4,495,083 | 1/1985 | Imazeki et al. | 252/299.1 |
| 4,514,317 | 4/1985 | Tuong et al. | 252/299.63 |

FOREIGN PATENT DOCUMENTS

| | | | |
|---|---|---|---|
| 26004 | 4/1981 | European Pat. Off. | 252/299.1 |
| 38460 | 10/1981 | European Pat. Off. | 252/299.1 |
| 55842 | 7/1982 | European Pat. Off. | 252/299.1 |
| 55838 | 7/1982 | European Pat. Off. | 252/299.1 |
| 65869 | 12/1982 | European Pat. Off. | 252/299.1 |

(List continued on next page.)

OTHER PUBLICATIONS

Cox, R. J., Mol. Cryst. Liq. Cryst., vol. 55, pp. 1–32 (1979).
Bradshaw et al., "The Physical Properties of Cyanophenylcyclohexyl Ethanes (PECH)", Mol. Cryst. Liq. Cryst. 97, 177 (1983).

*Primary Examiner*—Teddy S. Gron
*Attorney, Agent, or Firm*—Jon S. Saxe; Bernard S. Leon; George W. Johnston

[57] ABSTRACT

A liquid crystalline mixture comprising
(a) at least one compound of the formula:

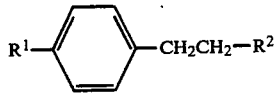

I wherein $R^1$ is alkyl, alkoxy, p-alkylphenyl, p-alkoxyphenyl, trans-4-alkylcyclohexyl, 4'-alkyl-4-biphenylyl, p-(trans-4-alkylcyclohexyl)phenyl, 2-(trans-4-alkylcyclohexyl)ethyl or p-[2-(trans-4-alkylcyclohexyl)ethyl]phenyl and $R^2$ is trans-4-alkylcyclohexyl; or $R^1$ is trans-4-alkylcyclohexyl and $R^2$ is p-(trans-4-alkylcyclohexyl)phenyl, p-[2-(trans-4-alkylcyclohexyl)ethyl]phenyl or 4'-(trans-4-alkylcyclohexyl)-4-biphenylyl; or $R^1$ is p-alkylphenyl and $R^2$ is p-[2-(trans-4-alkylcyclohexyl)ethyl]phenyl; and the alkyl and alkoxy groups in the substituents $R^1$ and $R^2$ are straight-chain groups of 1 to 7 carbon atoms, and;

(b) at least one dichroic coloring substance selected from the group of compounds consisting of:

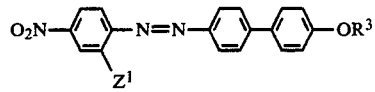

II

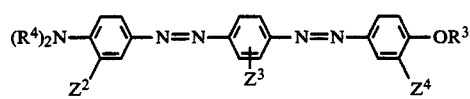

III

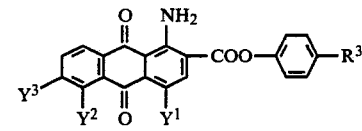

IV

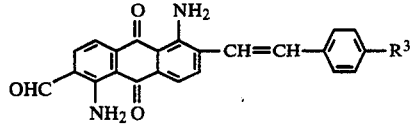

IVa and

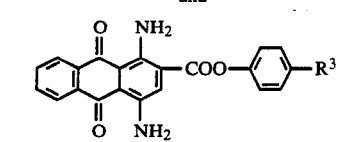

V wherein $R^3$ is straight-chain $C_1$–$C_{12}$-alkyl and $R^4$ is straight-chain $C_1$–$C_4$-alkyl, $Z^1$ is hydrogen or chlorine, one of the symbols $Z^2$, $Z^3$ and $Z^4$ is chlorine and the other two are hydrogen, and $Y^1$ is hydrogen, $Y^2$ is an amino group and $Y^3$ is methyl or $Y^1$ is hydroxy and $Y^2$ and $Y^3$ are hydrogen, and the use of these liquid crystalline mixtures in electro-optical devices are described.

17 Claims, No Drawings

COLORING SUBSTANCE-CONTAINING LIQUID CRYSTAL MIXTURES

BACKGROUND OF THE INVENTION

1. Field of the Invention

The present invention relates to colouring substance-containing liquid crystal mixtures, their manufacture and their use in electro-optical devices.

2. Background Description

Liquid crystalline mixtures which consist of a liquid crystal matrix (host) and dichroic colouring substances (guest) have a different light absorption depending on orientation. This effect is known in the literature as a guest-host effect and is used in electro-optical indicating devices. Further, it is known that the contrast can be improved by adding an optically active material to such mixtures.

The guest-host cell (guest-host display) comprises essentially a condenser, at least one electrode being transparent and the dielectric being formed from a nematic or cholesteric liquid crystal which contains one or more dichroic colouring substances. Since the usable colouring substances mainly have positive dichroism, i.e. the transition moment of the absorption of visible light lies approximately in the direction of the longitudinal molecular axis, the homogeneous orientation of the liquid crystal (longitudinal molecular axis parallel to the surface of the plates) generally corresponds to the coloured condition of the cell and the homeotropic orientation (longitudinal molecular axes perpendicular to the surface of the plates) generally corresponds to the colourless condition of the cell. For example, a liquid crystal with positive dielectric anisotropy ($\Delta\epsilon = \epsilon_\parallel - \epsilon_\perp > 0$, $\epsilon_\parallel$ signifying the dielectric constant along the longitudinal molecular axis and $\epsilon_\perp$ signifying the dielectric constant perpendicular thereto), which is homogeneously oriented by treatment of the surface of the plates, is orientated homeotropically by the application of a voltage. In this manner colourless symbols can be shown on a coloured or black background ("negative" contrast). On the other hand, a liquid crystal with negative dielectric anisotropy, which is homeotropically orientated by treatment of the surface of the plates, is orientated homogeneously by the application of a voltage, whereby the reading of coloured or black image elements on a colourless background is made possible ("positive" contrast).

The customary, static operation of liquid crystal indicating devices has in the past been replaced to an increasing extent by the so-called multiplex control. In general only multiplex ratios of about 1:8 to 1:10 have been attained employing the usual amplitude-selective multiplex procedures.

However, in order to improve the multiplex ratio in the multiplex control of liquid crystal indicators, especially of rotation cells and guest-host cells, a two-frequency matrix addressing procedure has been proposed (e.g. German Offenlegunsschriften Nos. 2 856 134 (Great Britain Pat. No. 2 013 104) and 2 907 940 (Great Britain Pat. No. 2 020 075. This makes use of the fact that the dielectric anisotropy of liquid crystals, which upon application of a low-frequency voltage have a positive anisotropy of the dielectric constants, is negative in the case of high frequencies. Not only positive but also negative contrasts can be produced with this procedure. Further, the two-frequency procedure offers the advantage that not only the switching-on operation, but also the switching-off operation can be influenced directly by the application of a corresponding alternating voltage, whereby an acceleration of the switching-off operation is achieved.

The previously known colouring substance-containing liquid crystal mixtures have above all the disadvantage that either the solubility or the degree of order of the colouring substance is too small or the stability towards UV-radiation is insufficient. Further, the previously known mixtures generally have relatively long response times.

The object of the present invention is therefore to provide novel coloured mixtures which do not have the aforementioned disadvantages or which have these disadvantages to lesser extent.

SUMMARY OF THE INVENTION

The present invention concerns a liquid crystalline mixture containing compounds of the formula:

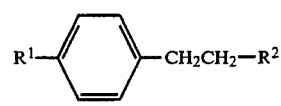

I wherein $R^1$ represents alkyl, alkoxy, p-alkylphenyl, p-alkoxyphenyl, trans-4-alkylcyclohexyl, 4'-alkyl-4-biphenylyl, p-(trans-4-alkylcyclohexyl)phenyl, 2-(trans-4-alkylcyclohexyl)ethyl or p-[2-(trans-4-alkylcyclohexyl)ethyl]phenyl and $R^2$ represents trans-4-alkylcyclohexyl, or $R^1$ represents trans-4-alkylcyclohexyl and $R^2$ represents p-(trans-4-alkylcyclohexyl)-phenyl, p-[2-(trans-4-alkylcyclohexyl)ethyl]-phenyl or 4'-(trans-4-alkylcyclohexyl)-4-biphenylyl, or $R^1$ represents p-alkylphenyl and $R^2$ represents p-[2-(trans-4-alkylcyclohexyl)ethyl]phenyl, and colouring substances of the formulae:

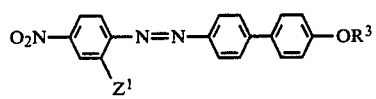

II

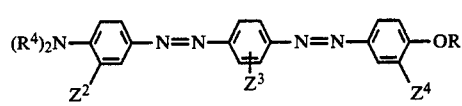

III

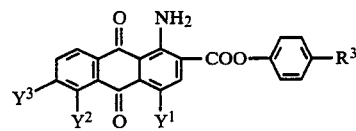

IV

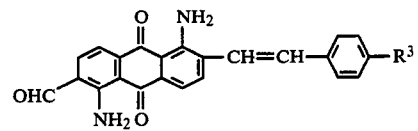

IVa and

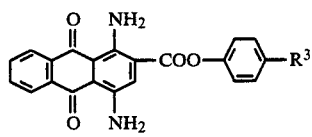

V wherein $R^3$ represents straight-chain $C_1$–$C_{12}$—alkyl and $R^4$ represents straightchain $C_1$–$C_4$—alkyl, $Z^1$ represents hydrogen or chlorine, one of $Z^2$, $Z^3$ and $Z^4$ represents chlorine and the other two represent hydrogen, and $Y^1$ represents hydrogen, $Y^2$ represents amino and $Y^3$ represents methyl or $Y^1$ represents hydroxy and $Y^2$ and $Y^3$ represent hydrogen, as well as the use of such liquid crystalline compounds for electro-optical purposes.

It has now surprisingly been found that the colouring substances of formulae II–V and IVa above in host phases which contain one or more compounds of formula I have a higher degree of order than in previously known host phases, which brings about a distinct improvement of the contrast (e.g. an increase of the degree of order from 0.77 to 0.82 corresponds to an improvement of the contrast by about 33%). The colouring substances of formulae II–V and IVa have a good solubility in the mixtures provided by the invention, are chemically stable and have an adequate stability towards UV-radiation. The compounds of formula II are yellow colouring substances, the compounds of formulae III, IV and IVa are red colouring substances and the compounds of formula V are blue colouring substances. Further, the absorption ranges of these colouring substances complement one another excellently, so that there can be manufactured mixtures of almost any colour and especially also black mixtures, which have a high absorption in the entire visible range.

Furthermore, the mixtures provided by the invention have a low viscosity and correspondingly short response times. The clearing points of the mixtures are usually increased very slightly by the addition of colouring substances of formulae II–V and IVa. Moreover, the good solubility of these colouring substances in the present host phases permits the manufacture of coloured mixtures with high optical thickness which even at temperatures of about $-30°$ C. give no crystallization or smectic tendencies. The compounds of formula I have small absolute values of the dielectric anisotropies. By the addition of suitable compounds there can, however, readily be manufactured mixtures with a large positive or negative anisotropy of the dielectric constants or mixtures which are suitable for two-frequency matrix addressing. Further, suitable optically active materials can, of course, also be added in order to improve the contrast.

DETAILED DESCRIPTION OF THE INVENTION

The present invention concerns a liquid crystalline mixture comprising
a. at least one compound of the formula:

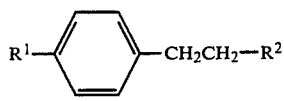

I wherein $R^1$ is alkyl, alkoxy, p-alkylphenyl, p-alkoxyphenyl, trans-4-alkylcyclohexyl, 4'-alkyl-4-biphenylyl, p-(trans-4-alkylcyclohexyl)phenyl, 2-(trans-4-alkylcyclohexyl)ethyl or p-[2-(trans-4-alkylcyclohexyl)ethyl]phenyl and $R^2$ is trans-4-alkylcyclohexyl; or $R^1$ is trans-4-alkylcyclohexyl and $R^2$ is p-(trans-4-alkylcyclohexyl)phenyl, p-2-(trans-4-alkylcyclohexyl)ethyl]phenyl or 4'-(trans-4-alkylcyclohexyl)-4-biphenylyl; or $R^1$ is p-alkylphenyl and $R^2$ is p-[2-(trans-4-alkylcyclohexyl)ethyl]phenyl; and the alkyl and alkoxy groups in the substituents $R^1$ and $R^2$ are straight-chain groups of 1 to 7 carbon atoms, and b. at least one dichroic colouring substance selected from the group of compounds consisting of:

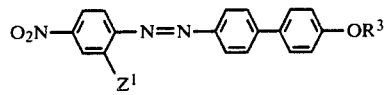

II

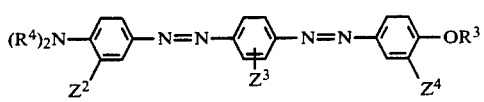

III

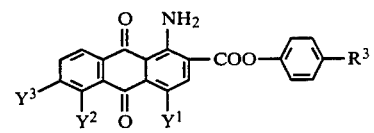

IV

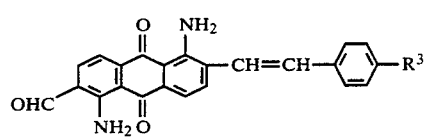

IVa and

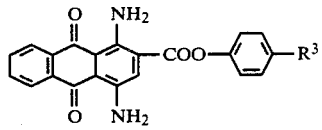

V wherein $R^3$ is straight-chain $C_1$–$C_{12}$—alkyl and $R^4$ is straight-chain $C_1$–$C_4$—alkyl, $Z^1$ is hydrogen or chlorine, one of the symbols $Z^2$, $Z^3$ and $Z^4$ is chlorine and the other two are hydrogen, and $Y^1$ is hydrogen, $Y^2$ is an amino group and $Y^3$ is methyl or $Y^1$ is hydroxy and $Y^2$ and $Y^3$ are hydrogen.

It has now surprisingly been found that the colouring substances of formulae II–V and IVa above in host phases which contain one or more compounds of formula I have a higher degree of order than in previously known host phases, which brings about a distinct improvement of the contrast (e.g. an increase of the degree of order from 0.77 to 0.82 corresponds to an improvement of the contrast by about 33%). The colouring substances of formulae II–V and IVa have a good solubility in the mixtures provided by the invention, are chemically stable and have an adequate stability towards UV-radiation. The compounds of formula II are yellow colouring substances, the compounds of formulae III, IV and IVa are red colouring substances and the compounds of formula V are blue colouring substances. Further, the absorption ranges of these colouring substances complement one another excellently, so that there can be manufactured mixtures of almost any colour and especially also black mixtures, which have a high absorption in the entire visible range.

Furthermore, the mixtures provided by the invention have a low viscosity and correspondingly short response times. The clearing points of the mixtures are usually increased very slightly by the addition of colouring substances of formulae II–V and IVa. Moreover, the good solubility of these colouring substances in the present host phases permits the manufacture of coloured mixtures with high optical thickness which even at temperatures of about −30° C. give no crystallization or smectic tendencies. The compounds of formula I have small absolute values of the dielectric anisotropies. By the addition of suitable compounds there can, however, readily be manufactured mixtures with a large positive or negative anisotropy of the dielectric constants or mixtures which are suitable for two-frequency matrix addressing. Further, suitable optically active materials can, of course, also be added in order to improve the contrast.

Unless otherwise stated, "alkyl" denotes a straight-chain alkyl group of 1 to 12 carbon atoms or a branched-chain alkyl group of 1 to 12 carbon atoms. Exemplary straight-chain alkyl groups are methyl, ethyl, propyl, butyl, pentyl, hexyl, heptyl octyl, nonyl, decyl, undecyl and dodecyl. Exemplary branched-chain alkyl groups are isopropyl, isobutyl, sec-butyl, 1-methylbutyl, 2-methylbutyl, 3-methylpentyl, 4-methylhexyl and isopentyl.

The term "alkoxy" as well as any other groups in the specification containing "alkyl" denote moieties in which their "alkyl" portions are as defined previously. In particular, straight-chain alkoxy groups denote moieties having a straight-chain alkyl portion as previously defined. Exemplary straight-chained alkoxy groups are methoxy, ethoxy, propyloxy, butyloxy, pentyloxy, hexyloxy, heptyloxy.

Unless otherwise stated, the term "halogen" denotes fluorine, chlorine or bromine and the term "alkali metal" denotes sodium, potassium or lithium.

Unless otherwise stated, the term "amino group" as used herein means —NH$_2$.

As used herein, the phrase "at least one dichroic colouring substance selected from the group consisting of the compounds of formulae II–V and IVa" means all normal combinations of compounds of formulae II–V and IVa including:
(i) one or more compounds of any one formula of IV–V and IVa; and/or
(ii) two or more compounds of two or more formulae of II–V and IVa.

The amount of compounds of formula I in the inventive mixtures can vary in a wide range. The mixtures provided by the invention preferably contain about 7 to about 90 wt.% and particularly about 10 to about 70 wt.% of compounds of formula I. Preferably, however, the amount of the individual compounds of formula I does not lie above about 50 wt.% in the case of the compounds having 2 rings and does not lie above about 25 wt.% in the case of the compounds having 3–5 rings. Further, those mixtures which contain at least one of the compounds of formula I having 3–5 rings are preferred.

In formula I, R$^1$ preferably represents alkyl, alkoxy, trans-4-alkylcyclohexyl, 4'-alkyl-4-biphenylyl or p-(trans-4-alkylcyclohexyl)phenyl and R$^2$ preferably represents trans-4-alkylcyclohexyl, or R$^1$ preferably represents trans-4-alkylcyclohexyl and R$^2$ preferably represents p-[2-(trans-4-alkylcyclohexyl)ethyl]phenyl or 4'-(trans-4-alkylcyclohexyl)-4-biphenylyl. Compounds of formula I in which R$^1$ represents alkoxy, trans-4-alkylcyclohexyl or p-(trans-4-alkylcyclohexyl)phenyl and R$^2$ represents trans-4-alkylcyclohexyl, or R$^1$ represents trans-4-alkylcyclohexyl and R$^2$ represents p-[2-(trans-4-alkylcyclohexyl)ethyl]phenyl are especially preferred. Further, there are in principle preferred those compounds of formula I in which the sum of the carbon atoms in the two terminal alkyl or alkoxy groups of R$^1$ and R$^2$ amounts to 5 to 10. Examples of especially preferred compounds are the compounds of formula I set forth in the Mixture Examples hereinafter.

The content of colouring substances of formulae II–V and IVa in the mixtures provided by the invention can likewise vary in a relatively wide range having regard to their good solubility. However, the total amount of colouring substances of formulae II–V and IVa is preferably about 0.2 to about 12 wt.% and particularly about 0.5 to about 8 wt.%. The mixtures provided by the invention can contain one or more colouring substances. They preferably contain at most about 8 wt.% of colouring substances of formula II, at most about 4 wt.% of colouring substances of formula III, at most about 4 wt.% of colouring substances of formula IV, at most about 4 wt.% of colouring substances of formula IVa and at most about 6 wt.% of colouring substances of formula V. More preferably, the inventive mixtures contain from about 0.2 to about 8 wt.% of the compounds of formula II, from about 0.2 to about 4 wt.% of the compounds of formula III or IV or IVa, or from about 0.2 to about 6 wt.% of the compounds of formula V. When several colouring substances are used, their ratio is determined mainly by the colour which is desired. The double bond —CH=CH— in formula IVa is preferably transdisubstituted.

Black colouring substance mixtures which contain at least one compound of formula II at least one compound of formula III, IV or IVa and at least one compound of formula V are especially preferred. Such mixtures conveniently contain about 0.1–0.4 part by weight of colouring substance of formula II and about 0.2–0.6 part by weight of colouring substance of formula III, IV or IVa per part by weight of colouring substance of formula V and preferably about 0.25–0.30 part by weight of colouring substance of formula II and about 0.25–0.50 part by weight of colouring substance of formula III, IV or IVa per part by weight of colouring substance of formula V.

In formulae II–V and IVa above, R$^3$ preferably represents C$_5$–C$_9$—alkyl, especially heptyl, and R$^4$ preferably represents methyl or ethyl, especially methyl. Also, in formulae II–V and IVa Z$^4$ preferably represents chlorine and Z$^2$ and Z$^3$ preferably represent hydrogen.

The compounds of formulae II–V and IVa are known or can be prepared according to methods known per se.

The compounds of formula I in which R$^1$ represents alkyl, alkoxy, p-alkylphenyl or p-alkoxyphenyl and R$^2$ represents trans-4-alkylcyclohexyl are known. The remaining compounds of formula I are novel and likewise form an object of the present invention. They can be prepared as illustrated in the following Reaction Schemes 1 and 2 in which R$^5$ represents trans-4-alkylcyclohexyl, 4'-alkyl-4-biphenylyl, p-(trans-4-alkylcyclohexyl)phenyl or 2-(trans-4-alkylcyclohexyl)ethyl and R$^6$ represents trans-4-alkylcyclohexyl, or R$^5$ represents trans-4-alkylcyclohexyl and R$^6$ represents p-(trans-4-alkylcyclohexyl)phenyl, p-[2-(trans-4-alkylcyclohexyl)ethyl]phenyl or 4'-(trans-4-alkylcyclohexyl)-4-biphenylyl, or R$^5$ represents p-alkylphenyl and R$^6$ represents p-[2-(trans-4-alkylcyclohexyl)ethyl]phenyl and R$^7$ and R$^8$ as well as the alkyl groups in the substituents R$^5$ and R$^6$ are straight-chain C$_1$–C$_7$-alkyl.

Reaction Scheme 1

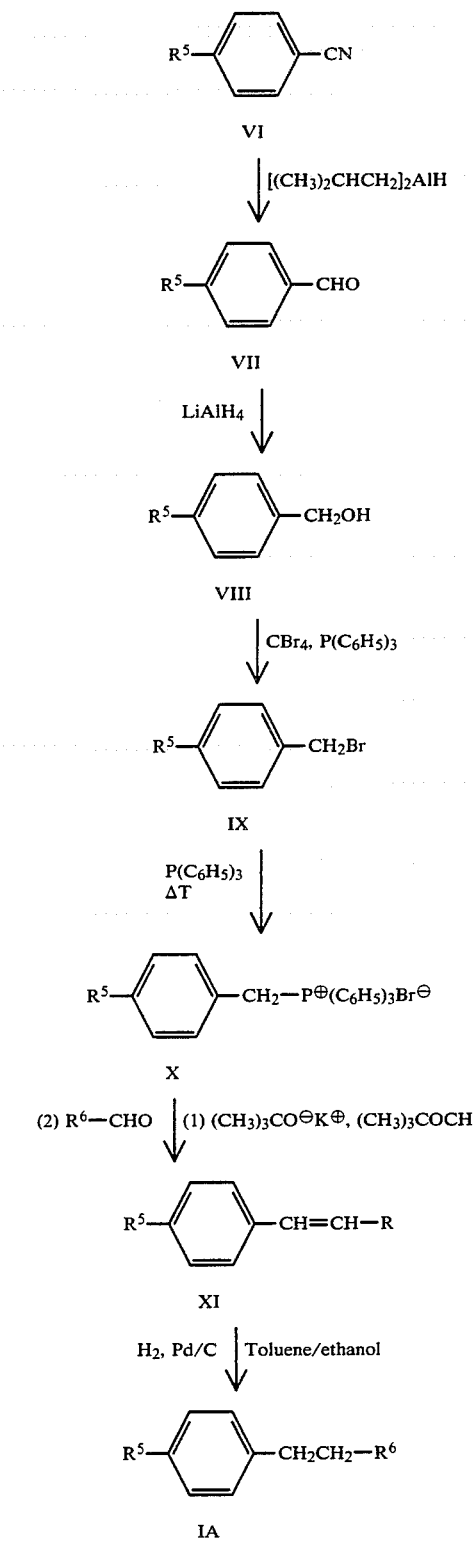

Reaction Scheme 2

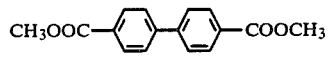

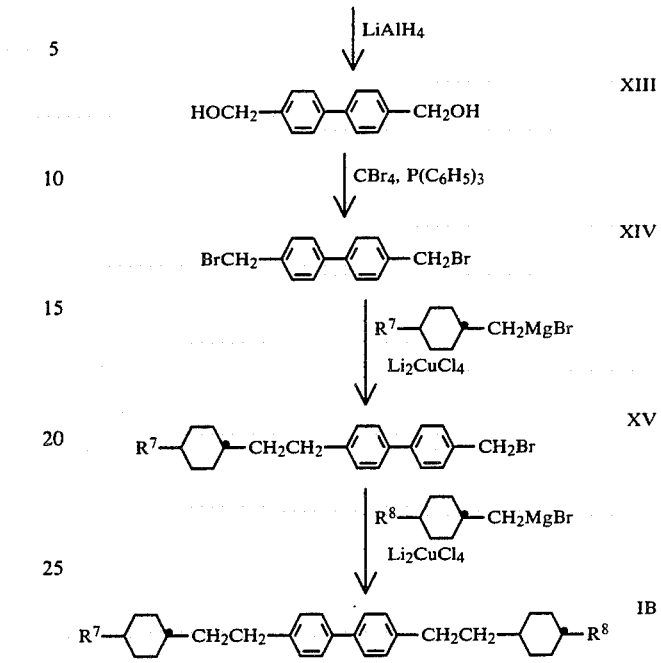

The compounds of formula $R^6$-CHO in Scheme 1 can be obtained in a simple manner from known compounds; for example, the trans-4-alkylcyclohexanecarboxaldehydes can be obtained by Rosenmund reduction of the corresponding acid chlorides and the remaining compounds can be obtained by reducing the corresponding cyano compounds (in an analogous manner to the preparation of the compounds of formula VII).

By reacting the compound of formula XIV with Grignard reagents in accordance with Scheme 2 there can be obtained compounds of formula XV or directly compounds of formula IB in which $R^7$ and $R^8$ have the same significance. When at least about 2 mol of Grignard reagent are used per mol of the compound of formula XIV there is generally predominantly formed directly a compound of formula IB.

Depending on the intended use, the mixtures provided by the invention can contain additional substances such as, for example, substances from the classes of Schiff's bases, phenyl benzoates, cyclohexanecarboxylic acid phenyl esters, cyclohexanecarboxylic acid cyclohexyl esters, biphenyls, terphenyls, phenylcyclohexanes, cyclohexylbiphenyls, phenylpyrimidines, diphenylpyrimidines, cyclohexyl-phenylpyrimidines, phenyldioxanes, phenylpyridazines, 2,3-dicyano-1,4-phenylene derivatives and the like. Such substances are known to the person skilled in the art and many of them are, moreover, commercially available.

The mixtures provided by the invention with positive dielectric anisotropy preferably contain, in addition to one or more compounds of formula I and one or more colouring substances of formulae II–V and IVa, one or more compounds of the formulae:

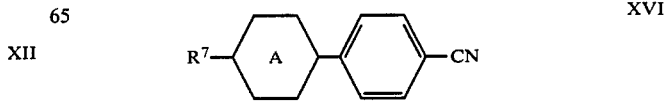

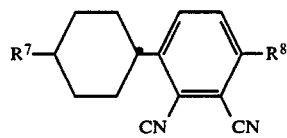 XVII

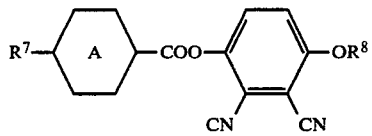 XVIII

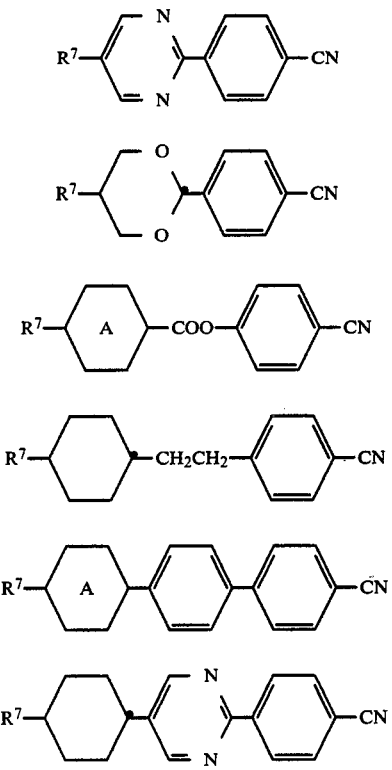

XIX

XX

XXI

XXII

XXIII

XXIIIa

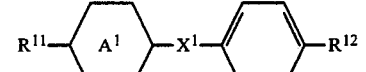 XXVI

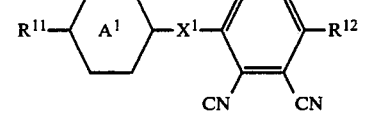 XXVII

XXVIII wherein $R^7$ and $R^8$ represent straight-chain $C_1$–$C_7$-alkyl and ring A represents 1,4-phenylene or trans-1,4-cyclohexylene; $R^9$ represents straight-chain $C_1$–$C_{12}$-alkyl and $R^{10}$ represents straight-chain $C_1$–$C_{10}$-alkyl, $C_2$–$C_{10}$-1-alkynyl, $C_1$–$C_{10}$-alkoxy, p-($C_1$–$C_{10}$-alkyl)phenyl, p-($C_1$–$C_{10}$-alkoxy)phenyl or trans-4-($C_1$–$C_{10}$-alkyl)-cyclohexyl; $R^{11}$ and $R^{12}$ represent straight-chain $C_1$–$C_{12}$-alkyl or on an aromatic ring also straight-chain $C_1$–$C_{12}$-alkoxy, or one of $R^{11}$ and $R^{12}$ also represents a group of the formula:

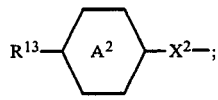 XXIX $X^1$ and $X^2$ represent single covalent bonds or one of $X^1$ and $X^2$ also represents —$CH_2CH_2$—; rings $A^1$ and $A^2$ represent 1,4-phenylene or, insofar as $X^1$ or $X^2$ represents —$CH_2CH_2$—, also trans-1,4-cyclohexylene; and $R^{13}$ represents straight-chain $C_1$–$C_{12}$-alkyl or on an aromatic ring $A^2$ also straight-chain $C_1$–$C_{12}$-alkoxy.

wherein $R^7$ represents straight-chain $C_1$–$C_7$-alkyl and ring A represents 1,4-phenylene or trans-1,4-cyclohexylene. It is especially preferred to use compounds of formula XVI, XVII, XXI and XXII. The compounds of formulae XVI–XXIII are conveniently present in an amount of about 10 to about 60 wt.%, preferably about 20 to about 40 wt.%.

The mixtures provided by the invention with negative dielectric anisotropy preferably contain, in addition to one or more compounds of formula I and one or more colouring substances of formulae II–V and IVa, one or more compounds of the formulae:

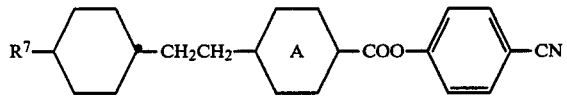 XXIV

XXV

It is especially preferred to use compounds of formulae XXV and XXVIII. The compounds of formulae XXIV–XXVIII can generally be present in an amount of about 10 to about 60 wt.% preferably about 20 to about 40 wt.%. Since, however, some of the compounds of formulae XXIV–XXVIII have no enantiotropic liquid crystalline phases, care should be taken that the residual mixture (consisting of the remaining components of the total mixture) has a sufficiently large mesophase range.

The mixtures provided by the invention which are suitable for two-frequency matrix addressing contain, in addition to one or more compounds of formula I and one or more colouring substances of formulae II–V and IVa, one or more compounds with a low "cross-over frequency" $f_c$ (dielectric relaxation frequency at which $\epsilon_\parallel = \epsilon_\perp$; $f_c$ preferably being $\leq 15$ kHz at 20° C.) in the total mixture and a large positive anisotropy of the dielectric constants in the case of low-frequency voltages ($\Delta\epsilon$ preferably being $>10$). Among such compounds there are preferred and compounds of the formula:

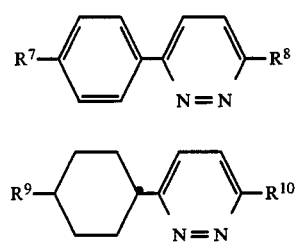

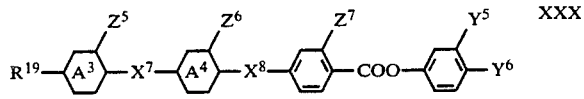 XXX wherein $X^8$ represents a single covalent bond or —COO—; $X^7$ represents a single covalent bond, —COO—, —CH$_2$CH$_2$— or, insofar as $X^8$ represents —COO—, also 1,4-phenylene; ring $A^3$ represents a benzene ring or trans-1,4-cyclohexylene; ring $A^4$ represents a benzene ring or, insofar as $X^8$ represents —COO— and $X^7$ represents a single covalent bond, —COO— or —CH$_2$CH$_2$—, also trans-1,4-cyclohexylene; the symbols $Z^5$, $Z^6$ and $Z^7$ represent hydrogen or on a benzene ring which is not linked directly with a further ring via a single covalent bond also halogen, cyano or methyl; $Y^6$ represents cyano, nitro, 2,2-dicyanovinyl or, insofar as $Y^5$ represents hydrogen, also 2,2-dicyano-1-methylvinyl; $Y^5$ represents halogen, cyano, $C_1$–$C_3$-alkyl or, insofar as $X^7$ represents p-phenylene or $Y^6$ represents nitro or $Z^5$ and/or $Z^6$ are/is different from hydrogen, also hydrogen; and $R^{19}$ represents $C_1$–$C_{12}$-alkyl or on a benzene ring also $C_1$–$C_{12}$-alkoxy, and the compounds of the formula:

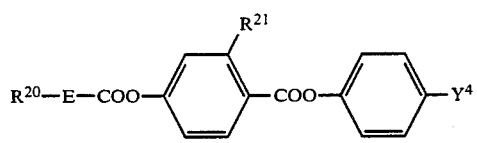
XXXI wherein $R^{21}$ represents hydrogen, halogen or cyano; $Y^4$ represents cyano, 2,2-dicyanovinyl or 2,2-dicyano-1-methylvinyl; $R^{20}$ and E together represent p-$R^{20}$-phenyl, trans-4-$R^{20}$-cyclohexyl, 4'-$R^{20}$-4-biphenylyl, p-(trans-4-$R^{20}$-cyclohexyl)phenyl, p-(5-$R^{20}$-2-pyrimidinyl)phenyl, p-[2-(p'-$R^{20}$-phenyl)ethyl]phenyl, p-[2-(trans-4-$R^{20}$-cyclohexyl)ethyl]phenyl, trans-4-[2-(p-$R^{20}$-phenyl)ethyl]cyclohexyl or trans-4-[2-(trans-4-$R^{20}$-cyclohexyl)ethyl]cyclohexyl; and $R^{20}$ represents straight-chain $C_1$–$C_{12}$-alkyl or on a benzene ring also straight-chain $C_1$–$C_{12}$-alkoxy. The term "halogen" above stands for fluorine, chlorine or bromine. The lateral substituents $Z^5$, $Z^6$, $Z^7$ and $R^{21}$ preferably represent hydrogen or chlorine. The compounds of formulae XXX and XXXI are conveniently present in an amount of about 5 to about 40 wt.%, preferably about 10 to about 30 wt.%, in the total mixture. In order to improve the dielectric anisotropies in the case of high-frequency voltages, the mixtures provided by the invention which are used for the two-frequency matrix addressing preferably contain one or more compounds of formulae XXIV–XXVIII. The amount of these compounds in the total mixture is preferably about 3 to about 50 wt.%, particularly about 3 to about 40 wt.%.

The mixtures provided by the invention can also contain optically active compounds, for example optically active biphenyls, cholesteryl chloride, cholesteryl esters and the like. Such additives are known to the person skilled in the art. The amount of such compounds is determined primarily by the desired pitch. They are preferably present in the total mixture in an amount of at most about 4 wt.%.

Furthermore, the mixtures provided by the invention can contain, in addition to compounds of formula I, other compounds with a small absolute sum of the dielectric anisotropies. Among such compounds there are preferred the compounds of the formula:

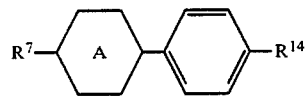 XXXII

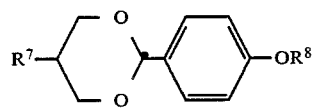 XXXIII

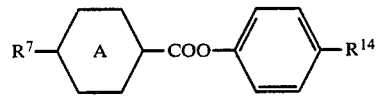 XXXIV

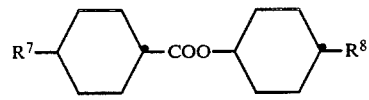 XXXV

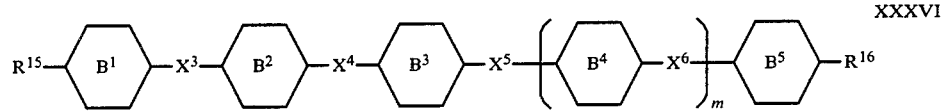 XXXVI wherein $R^7$ and $R^8$ represent straight-chain $C_1$–$C_7$-alkyl, $R^{14}$ represents straight-chain $C_1$–$C_8$-alkyl or $C_1$–$C_8$-alkoxy and ring A represents 1,4-phenylene or trans-1,4-cyclohexylene; m stands for 0 or 1; one of the symbols $X^3$ and $X^4$ represents —COO— or —OOC— and the remainder of the symbols $X^3$, $X^4$, $X^5$ and $X^6$ represent a single covalent bond, or one of these symbols also represents —CH$_2$CH$_2$—; rings $B^1$ and $B^5$ represent a group of the formula

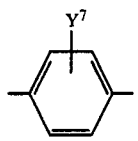

XXXVII or trans-1,4-cyclohexylene; rings $B^2$, $B^3$ and $B^4$ represent a group of formula XXXVII or, insofar as they are not linked with at least one of the other two of these rings by a single covalent bond, also trans-1,4-cyclohexylene; $Y^7$ represents hydrogen or on one of the rings of formula XXXVII which is not linked with a further ring via a single covalent bond also fluorine, chlorine or methyl; $R^{15}$ and $R^{16}$ represent straight-chain $C_1$–$C_7$-alkyl or on a ring of formula XXXVII also straight-chain $C_1$–$C_7$-alkoxy, and especially the compounds of formulae XXXII, XXXIV and XXXVI. The amount of compounds of formulae XXXII–XXXVI present is preferably at most about 50 wt.%. Such compounds can, however, also be omitted entirely.

The manufacture of the liquid crystalline mixtures provided by the invention can be carried out in a manner known per se; for example, by heating a mixture of the ingredients to a temperature barely above the clearing point and subsequent cooling down.

The manufacture of an electro-optical device containing a mixture provided by the invention can also be carried out in a manner known per se; for example, by evacuating a suitable cell and introducing the mixture into the evacuated cell.

The compounds of formula XXIIIa are novel. They can be prepared by esterification in a manner known per se.

The compounds of formula XXV are also novel. They can be prepared in a manner known per se by a. for the preparation of the compounds of formula XXV in which $R^{10}$ represents an alkyl, p-alkylphenyl, p-alkoxyphenyl or trans-4-alkylcyclohexyl group, subjecting a compound of the formula:

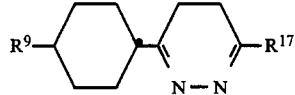

XXXVIII wherein $R^{17}$ represents an alkyl, p-alkylphenyl, p-alkoxyphenyl or trans-4-alkylcyclohexyl group, the alkyl and alkoxy groups in $R^{17}$ are straight-chain groups containing 1 to 10 carbon atoms and $R^9$ has the significance given above, or a tautomeric dihydropyridazine to oxidation (e.g. with 2,3-dichloro-5,6-dicyano-p-benzoquinone in dioxan, with sodium nitrite in glacial acetic acid and ethanol, with isopentyl nitrite in glacial acetic acid or preferably by catalytic dehydrogenation with palladium, platinum and the like), or b. for the preparation of the compounds of formula XXV in which $R^{10}$ represents an alkoxy group, reacting a compound of the formula:

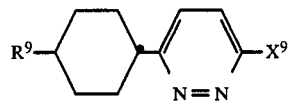

XXXIX wherein $X^9$ represents chlorine or bromine and $R^9$ has the significance given above, with an alkali metal alcoholate (e.g. a sodium alkanolate), or c. for the preparation of the compounds of formula XXV in which $R^{10}$ represents the ethynyl group, reacting a compound of the formula:

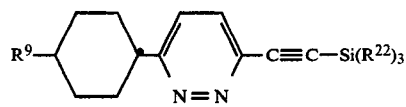

XL wherein $R^{22}$ represents an alkyl group containing 1 to 5 carbon atoms and $R^9$ has the significance given above, with a base (e.g. potassium hydroxide, sodium hydroxide or butyl lithium), or d. for the preparation of the compounds of formula XXV in which $R^{10}$ represents a 1-alkynyl group containing 3 to 10 carbon atoms, converting a compound of the formula:

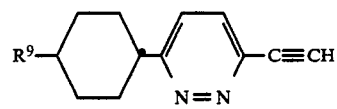

XLI wherein $R^9$ has the significance given above, with a base (e.g. butyl lithium, methyl lithium, sodium amide or lithium diisopropylamide) into the corresponding ethynylide and alkylating the ethynylide with an alkyl bromide or alkyl iodide.

The compounds of formula XXXVIII can rearrange to tautomeric compounds by migration of the double bonds in the dihydropyridazine ring. Such rearrangements can be brought about, for example, by the presence of a trace of acid or base. Since the tautomeric dihydropyridazines can, however, also be oxidized under the above conditions to compounds of formula XXV, not only a compound of formula XXXVIII but also a tautomeric dihydropyridazine or a mixture of such compounds can be reacted in accordance with variant (a).

The starting materials of formulae XXXVIII and XXXIX are novel. They can be prepared as illustrated in the following Reaction Schemes 3–6 in which $R^9$, $R^{17}$ and $X^9$ have the significances given above and $R^{18}$ represents a straight-chain alkyl or alkoxy group containing 1 to 10 carbon atoms.

Reaction Scheme 3

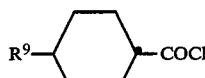

XLII

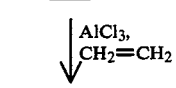

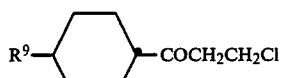

XLIII

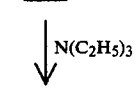

-continued
Reaction Scheme 3
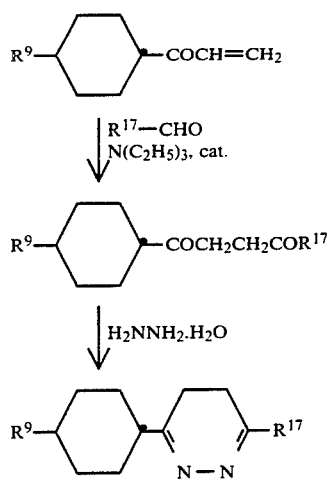
Reaction Scheme 4
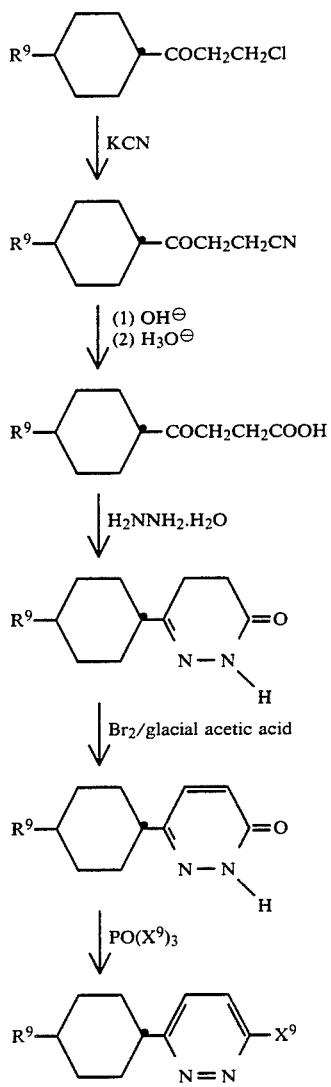
Reaction Scheme 5
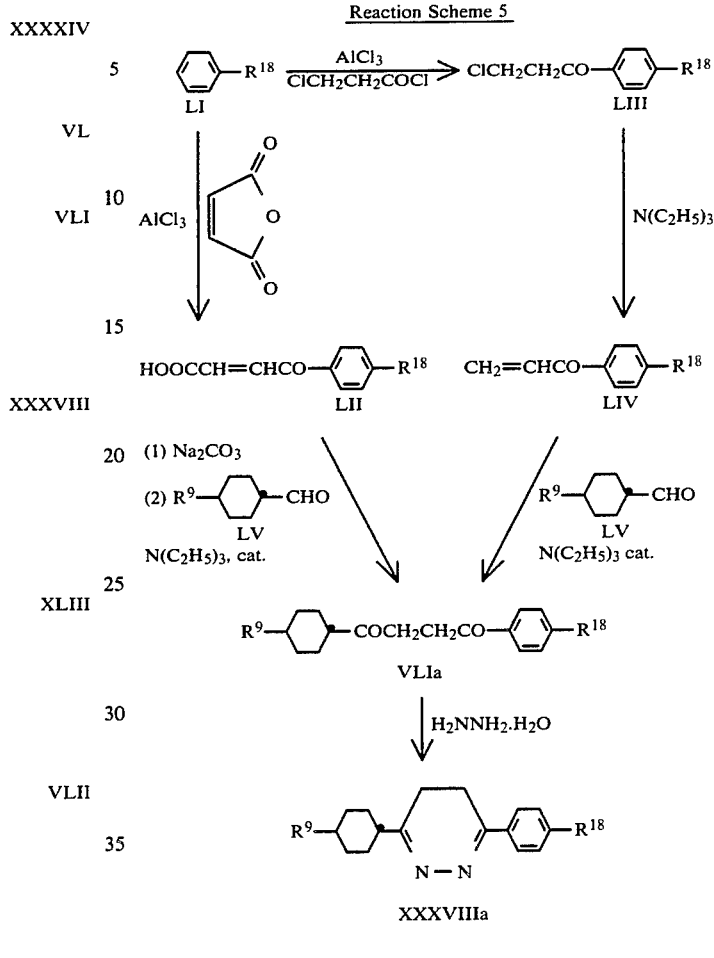
Reaction Scheme 6
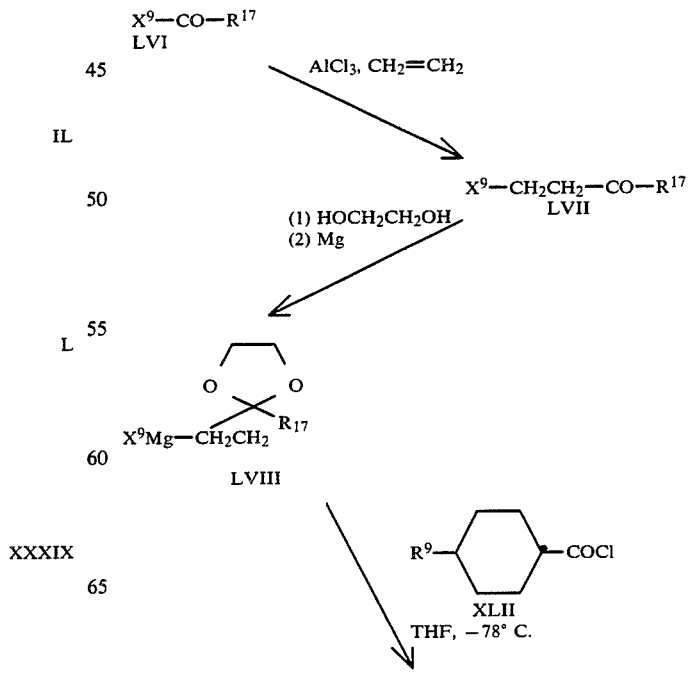

-continued
Reaction Scheme 6

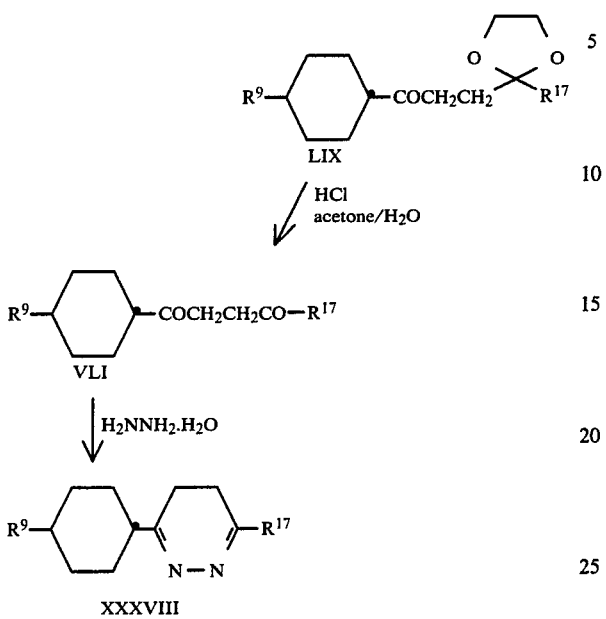

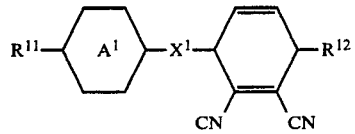

wherein $R^{12}$ represents straight-chain $C_1$–$C_{12}$-alkyl or a group of formula XXIX and $R^{11}$, $X^1$ and ring $A^1$ have the signficances given in formula XXVIII, to oxidation (e.g. with 2,3-dichloro-5,6-dicyano-p-benzoquinone in dioxan), or b. for the preparation of the compounds of formula XXVIII in which $R^{12}$ represents straight-chain $C_1$–$C_{12}$-alkoxy, reacting a compound of the formula:

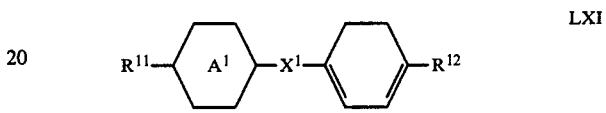

wherein $R^{12}$ represents straight-chain $C_1$–$C_{12}$-alkoxy and $R^{11}$, $X^1$ and ring $A^1$ have the significances given in formula XXXVIII, with dicyanoacetylene in an ether (e.g. tetrahydrofuran) and subsequently cleaving off ethylene by heating.

The starting materials of formulae XLII, VL, LI, LV and LVI are known or are analogues of known compounds and can be prepared in a known manner. For example, the aldehydes of formula LV can be prepared by Rosenmund reduction of the acid chlorides of formula XLII.

The addition of an aldehyde to a compound of formula XXXXIV, LII or LIV can be carried out according to the method of Stetter [Chem. Ber. 114 (1981) 581] in the presence of a 1,3-thiazolium salt catalyst. 3-Benzyl-5-(2-hydroxyethyl)-4-methyl-1,3-thiazolium chloride is the preferred catalyst for the addition of an aldehyde of formula LV or of an aldehyde of formula VL in which $R^{17}$ represents alkyl or trans-4-alkylcyclohexyl and 3,4-dimethyl-5-(2-hydroxyethyl)-1,3-thiazolium iodide is the preferred catalyst for the addition of an aldehyde of formula VL in which $R^{17}$ represents p-alkylphenyl or p-alkoxyphenyl.

The coupling of a compound of formula LVIII with a compound of formula XLII can be carried out according to the method described by T. Sato et al. in Bull. Chem. Soc. Japan 54 (1981) 505.

The compounds of formula XL are also novel. They can be obtained in a manner known per se by reacting a compound of formula XXXIX with an ethynyltrialkylsilane in the presence of triethylamine, bis-(triphenylphosphine)-palladium (II) dichloride and copper (I) iodide.

The compounds of formula XXVIII are also novel. They can be prepared in a manner known per se by a. for the preparation of the compounds of formula XXVIII in which $R^{12}$ represents straight-chain $C_1$–$C_{12}$-alkyl or a group of formula XXIX, subjecting a compound of the formula:

The compounds of formula LX can be prepared, for example, by reacting an aldehyde of the formula:

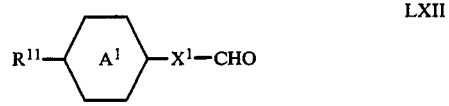

with a phosphonium salt of the formula:

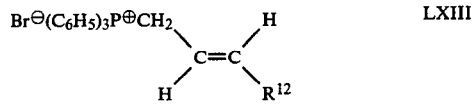

wherein $R^{11}$, $R^{12}$, $X^1$ and ring $A^1$ have the significances given in formula LX, in diethyl ether in the presence of butyl lithium and converting the diene obtained into a compound of formula LX by Diels-Alder reaction with dicyanoacetylene in tetrahydrofuran.

The compounds of formula LXI can be obtained, for example, by reducing a compound of the formula:

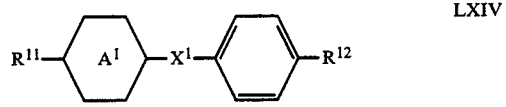

wherein $R^{11}$, $R^{12}$, $X^1$ and ring $A^1$ have the significances given in formula LXI, with lithium and liquid ammonia (preferably in a diethyl ether/ethanol mixture). In this case there is generally obtained the 1,4-diene or a mixture of the 1,3-diene (a compound of formula LXI) and the 1,4-diene. The isomerization to the 1,3-diene can be carried out, for example, with 2,3-dichloromaleic anhydride.

The compounds of formula XXX are also novel. They can be prepared in a manner known per se by esterifying the acid chloride of a compound of the formula:

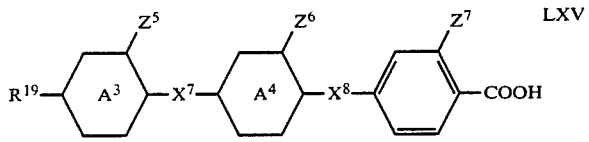

wherein $R^{19}$, $A^3$, $A^4$, $X^7$, $X^8$, $Z^5$, $Z^6$ and $Z^7$ have the significances given in formula XXX, with a phenol of the formula:

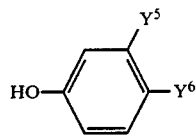

wherein $Y^5$ and $Y^6$ have the significances given in formula XXX, and, if desired, reacting a compound of formula XXX obtained in which $Z^5$, $Z^6$ or $Z^7$ represents bromine with copper (I) cyanide, sodium cyanide or potassium cyanide.

The compounds of formula LXVI in which $Y^6$ represents 2,2-dicyanovinyl can be prepared, for example, by converting 3-$Y^5$-anisole into 4-methoxy-2-$Y^5$-benzaldehyde by Vilsmeier reaction with dimethylformamide in the presence of phosphorus oxychloride, then hydrolyzing the methoxy group (e.g. by heating under reflux with pyridinium chloride and subsequent fractional distillation) and finally converting the 4-hydroxy-2-$Y^5$-benzaldehyde obtained into the compound of formula LXVI in which $Y^6$ represents 2,2-dicyanovinyl by Knoevenagel condensation with malononitrile (e.g. in the presence of catalytic amounts of glacial acetic acid and sodium acetate in boiling toluene). The remaining compounds of formula LXVI are known or are analogues of known compounds.

The compounds of formula LXV are also known or are analogues of known compounds and can be prepared according to known methods.

The compounds of formula LXV in which $X^8$ represents the ester group —COO— can be prepared, for example, by esterifying a compound of the formula:

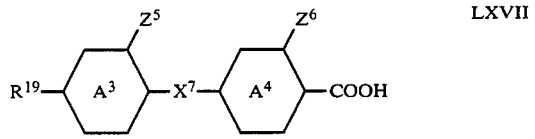

wherein $X^7$ represents a single covalent bond, the ester group —COO—, the ethylene group —CH$_2$CH$_2$— or 1,4-phenylene and $R^{19}$, $A^3$, $A^4$, $Z^5$ and $Z^6$ have the significances given in formula XXX, with 4-hydroxy-2-$Z^7$-benzaldehyde in methylene chloride in the presence of dicyclohexylcarbodiimide and 4-(dimethylamino)-pyridine and converting the resulting aldehyde into the corresponding acid of formula LXV by Jones' oxidation with chromic acid and sulphuric acid.

In the preparation of the acids of formula LXV in which $X^7$ represents the ethylene group —CH$_2$CH$_2$— and $X^8$ represents a single covalent bond and of the acids of formula LXVII in which $X^7$ represents the ethylene group —CH$_2$CH$_2$—, the linkage of rings $A^3$ and $A^4$ is conveniently carried out by a Fouquet-Schlosser reaction or by a Wittig reaction. For example, 4-(bromomethyl)-2-$Z^6$-benzonitrile, 4'-(bromomethyl)-4-biphenylcarbonitrile or trans-4-(tosyloxymethyl)cyclohexanecarbonitrile can be reacted with (4-$R^{19}$-2-$Z^5$-phenyl)methylmagnesium bromide or (trans-4-$R^{19}$-cyclohexyl)methylmagnesium bromide in the presence of dilithium tetrachlorocuprate and the nitrile obtained can be hydrolyzed to the desired acid. Further, for example, 4-$R^{19}$-2-$Z^5$-benzaldehyde or trans-4-$R^{19}$-cyclohexanecarboxaldehyde can be reacted with (4-methoxycarbonyl-3-$Z^6$-phenyl)methyl-triphenylphosphonium bromide ($Z^5$ and $Z^6$ signifying hydrogen, fluorine, cyano or methyl) in the presence of a base (e.g. sodium methylate), then the double bond can be catalytically hydrogenated and finally the ester group can be saponified.

The starting materials required for these reactions are known or can be prepared according to known methods. For example, 4-alkoxy-2-$Z^5$-acetophenone can be converted by haloform degradation into 4-alkoxy-2-$Z^5$-benzoic acid and this can be converted into 4-alkoxy-1-(bromomethyl)-2-$Z^5$-benzene by reduction with lithium aluminium hydride and bromination (e.g. with tetrabromomethane and triphenylphosphine). From methyl 2,4-dimethylbenzoate there can be obtained, for example, by reaction with N-bromosuccinimide and subsequent isomer separation methyl 4-(bromomethyl)-2-methylbenzoate which can be converted into methyl 4-formyl-2-methylbenzoate in an analogous manner to Org. Synth. Coll. V, 825; the methyl 4-alkyl-2-methylbenzoate obtained after reaction with alkyl-triphenylphosphonium bromide and base and subsequent catalytic hydrogenation of the double bond can then be saponified with sodium hydroxide to the acid or reduced with lithium aluminium hydride to the alcohol which finally can be converted with hydrogen bromide into the 4-alkyl-1-(bromomethyl)-2-methylbenzene or with manganese dioxide into the 4-alkyl-2-methylbenzaldehyde. 1-Alkyl-3-fluorobenzene can be converted, for example, into 4-alkyl-2-fluorobenzoic acid by reaction with butyl lithium and carbon dioxide and subsequent hydrolysis and 1-alkyl-3-chlorobenzene or 1-alkyl-3-bromobenzene can be converted into 4-alkyl-2-(chloro or bromo)benzoic acid by Friedel-Crafts acylation with acetyl chloride in the presence of aluminium trichloride and subsequent oxidation with sodium hypobromite; the acids obtained can then be converted with lithium aluminium hydride into the alcohols and these can be converted into the bromides with hydrogen bromide or into the aldehydes with manganese dioxide. Further, for example, 4-methyl-2-$Z^5$-benzoic acid can be reacted in sequence with thionyl chloride, ammonia and benzenesulphonyl chloride and the 4-methyl-2-$Z^5$-benzonitrile obtained can be converted into 4-(bromomethyl)-2-$Z^5$-benzonitrile with N-bromosuccinimide.

The compounds of formula XXXI are in part also novel compounds. They can be prepared by esterification in an analogous manner to the compounds of formula XXX. The acids required for the preparation of the compounds of formula XXXI can be obtained as illustrated in Reaction Scheme 7 in which $R^{20}$, $R^{21}$ and E have the significances given in formula XXXI above.

Formula Scheme 7

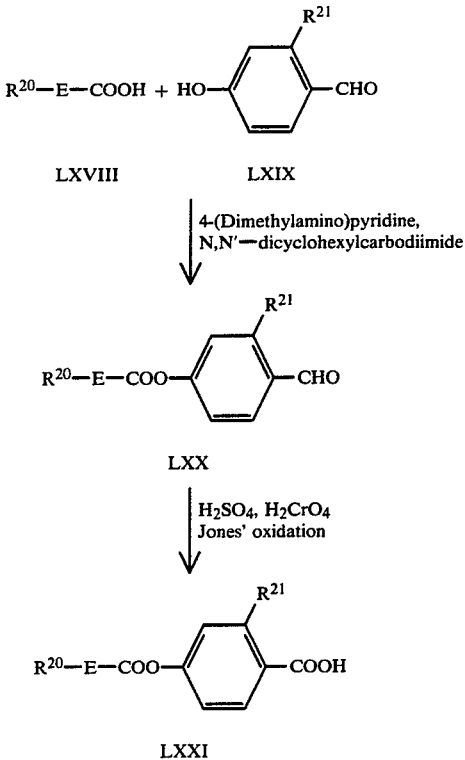

The compounds of formulae LXVIII and LXIX are known or can be prepared according to methods known per se.

The esters of formula XXXVI are novel. They can be obtained according to esterification methods which are known per se (e.g. in an analogous manner to the preparation of the compounds of formula XXX). The starting materials required for the preparation of the esters of formula XXXVI are known or are analogues of known compounds and can be prepared according to known methods.

The invention is also concerned with all novel compounds, mixtures, processes, uses and devices as herein described.

The following Mixtures A1 through D25 are examples of preferred host phases and of coloured mixtures provided by the invention. Mixtures $A^1$–$A^6$ are host phases with a positive dielectric anisotropy, mixture B1 is a host phase with a negative dielectric anisotropy, mixtures C1–C4 are host phases which are suitable for two-frequency matrix addressing and mixtures D1–D25 are examples of corresponding coloured mixtures. For mixtures D1–D5 there are given for comparison the corresponding degrees of order in the host phase RO-TN-605 of F. Hoffmann-La Roche. This mixture has a positive dielectric anisotropy and as is known gives for dissolved dichroic colouring substances very high degrees of order [Mol. Cryst. Liq. Cryst. 65 (1981) 241–264]. $f_c$ signifies the cross-over frequency, $\Delta\epsilon$ or $\Delta\epsilon_l$ signifies the low-frequency ("static") dielectric anisotropy (measured at frequencies which lie distinctly below the cross-over frequency), $\Delta\epsilon_h$ signifies the high-frequency dielectric anisotropy (measured at frequencies which lie distinctly above the cross-over frequency), $\eta$ signifies the viscosity (bulk viscosity) and S signifies the degree of order (at 22° C.). $\Delta$n signifies the optical anisotropy and $V_o$ signifies the threshold potential in a guest-host display with homogeneous wall orientation. $k_{11}$ (splay) and $k_{33}$ (bend) are elastic constants, $E_x$ is the molar isotropic extinction of the colouring substance at x nm (measured in chloroform unless indicated otherwise) and $\lambda_{max}$ is the wavelength with maximum extinction. Unless expressly indicated otherwise, all data were measured at 22° C., and the Mixture Examples were carried out as written.

Mixture A1
3.89 wt. % of 4'-propyl-4-cyanobiphenyl,
19.00 wt. % of 4'-pentyl-4-cyanobiphenyl,
5.72 wt. % of 4''-pentyl-4-cyano-p-terphenyl,
5.83 wt. % of 4'-(trans-4-pentylcyclohexyl)-4-cyanobiphenyl,
16.08 wt. % of 2-(trans-4-propylcyclohexyl)-1-(p-ethoxyphenyl)ethane,
22.16 wt. % of 2-(trans-4-pentylcyclohexyl)-1-(p-ethoxyphenyl)ethane,
12.79 wt. % of 1-[2-(trans-4-butylcyclohexyl)ethyl]-4-(trans-4-pentylcyclohexyl)benzene,
8.55 wt. % of 4-[2-(trans-4-butylcyclohexyl)ethyl]-4'-(trans-4-pentylcyclohexyl)-1,1'-ethylene dibenzene,
5.98 wt. % of 4-(trans-4-pentylcyclohexyl)-4'-[2-(trans-4-butylcyclohexyl)ethyl]biphenyl;
m.p. < −30° C., cl.p. 91.2° C., nematic; $\eta$ = 24.8 cP; $\Delta\epsilon$ = 6.19; $\Delta$n = 0.142; $k_{33}/k_{11}$ = 1.17; $V_o$ = 1.83 V.

Mixture A2
3.70 wt. % of 4'-propyl-4-cyanobiphenyl,
18.09 wt. % of 4'-pentyl-4-cyanobiphenyl,
5.45 wt. % of 4''-pentyl-4-cyano-p-terphenyl,
5.55 wt. % of 4'-(trans-4-pentylcyclohexyl)-4-cyanobiphenyl,
4.77 wt. % of 1-propyl-4-(trans-4-pentylcyclohexyl)benzene,
15.32 wt. % of 2-(trans-4-propylcyclohexyl)-1-(p-ethoxyphenyl)ethane,
21.10 wt. % of 2-(trans-4-pentylcyclohexyl)-1-(p-ethoxyphenyl)ethane,
12.18 wt. % of 1-[2-(trans-4-butylcyclohexyl)ethyl]-4-(trans-4-pentylcyclohexyl)benzene,
8.14 wt. % of 4-[2-(trans-4-butylcyclohexyl)ethyl]-4'-(trans-4-pentylcyclohexyl)-1,1'-ethylene-dibenzene,
5.70 wt. % of 4-(trans-4-pentylcyclohexyl)-4'-[2-(trans-4-butylcyclohexyl)ethyl]biphenyl;
m.p. < −30° C., cl.p. 88.2° C., nematic; $\eta$ = 21.0 cP; $\Delta\eta$ = 5.84; $\Delta$n = 0.140; $k_{33}/k_{11}$ = 1.05; $V_o$ = 1.87 V.

Mixture A3
3.23 wt. % of 4'-propyl-4-cyanobiphenyl,
16.75 wt. % of 4'-pentyl-4-cyanobiphenyl,
4.75 wt. % of 4''-pentyl-4-cyano-p-terphenyl,
4.84 wt. % of 4'-(trans-4-pentylcyclohexyl)-4-cyanobiphenyl,
16.03 wt. % of 2-(trans-4-propylcyclohexyl)-1-(p-ethoxyphenyl)ethane,
9.72 wt. % of 2-(trans-4-propylcyclohexyl)-1-(p-butoxyphenyl)ethane,
18.56 wt. % of 2-(trans-4-pentylcyclohexyl)-1-(p-ethoxyphenyl)ethane,
11.59 wt. % of 1-[2-(trans-4-butylcyclohexyl)ethyl]-4-(trans-4-pentylcyclohexyl)benzene,
8.55 wt. % of 4-[2-(trans-4-butylcyclohexyl)ethyl]-4'-(trans-4-pentylcyclohexyl)-1,1'-ethylene-dibenzene,
5.98 wt. % of 4-(trans-4-pentylcyclohexyl)-4'-[2-(trans-4-butylcyclohexyl)ethyl]biphenyl;
m.p. < −30° C., cl.p. 85.7° C., nematic; $\eta$ = 21.5 cP; $\Delta\epsilon$ = 5.40; $\Delta$n = 0.133; $k_{33}/k_{11}$ = 1.07; $V_o$ = 1.91 V.

Mixture A4
4.36 wt. % of 4'-ethyl-4-cyanobiphenyl,
3.33 wt. % of 4'-propyl-4-cyanobiphenyl,
16.49 wt. % of 4'-pentyl-4-cyanobiphenyl,
4.90 wt. % of 4''-pentyl-4-cyano-p-terphenyl,
4.98 wt. % of 4'-(trans-4-pentylcyclohexyl)-4-cyanobiphenyl,
15.67 wt. % of 2-(trans-4-propylcyclohexyl)-1-(p-ethoxyphenyl)ethane,
6.36 wt. % of 2-(trans-4-propylcyclohexyl)-1-(p-butoxy- -continued phenyl)ethane,
18.19 wt. % of 2-(trans-4-pentylcyclohexyl)-1-(p-ethoxyphenyl)ethane,
11.92 wt. % of 1-[2-(trans-4-butylcyclohexyl)ethyl]-4-(trans-4-pentylcyclohexyl)benzene,
6.90 wt. % of 4-[2-(trans-4-butylcyclohexyl)ethyl]-4'-(trans-4-pentylcyclohexyl)-1,1'-ethylenedibenzene,
6.90 wt. % of 4-(trans-4-pentylcyclohexyl)-4'-[2-(trans-4-butylcyclohexyl)ethyl]biphenyl;
m.p. < $-30°$ C., cl.p. $87.0°$ C., nematic: $\eta = 24.0$ cP; $\Delta\epsilon = 6.10$; $\Delta n = 0.143$; $k_{33}/k_{11} = 1.10$; $V_o = 1.74$ V.

Mixture A5
5.36 wt. % of 4'-ethyl-4-cyanobiphenyl,
3.18 wt. % of 4'-propyl-4-cyanobiphenyl,
6.08 wt. % of 4'-butyl-4-cyanobiphenyl,
6.53 wt. % of p-(trans-4-propylcyclohexyl)benzonitrile,
14.67 wt. % of p-(trans-4-pentylcyclohexyl)benzonitrile,
5.60 wt. % of 4''-pentyl-4-cyano-p-terphenyl,
5.71 wt. % of 4'-(trans-4-pentylcyclohexyl)-4-cyanobiphenyl,
2.84 wt. % of trans-4-[2-(trans-4-propylcyclohexyl)ethyl]-cyclohexanecarboxylic acid p-cyanophenyl ester,
5.21 wt. % of 4-ethyl-1-(trans-4-propylcyclohexyl)benzene,
16.54 wt. % of 2-(trans-4-propylcyclohexyl)-1-(p-ethoxyphenyl)ethane,
15.95 wt. % of 1-[2-(trans-4-butylcyclohexyl)ethyl]-4-(trans-4-pentylcyclohexyl)benzene,
7.59 wt. % of 4-[2-(trans-4-butylcyclohexyl)ethyl]-4'-(trans-4-pentylcyclohexyl)-1,1'-ethylenedibenzene,
4.74 wt. % of 4-(trans-4-pentylcyclohexyl)-4'-[2-(trans-4-butylcyclohexyl)ethyl]biphenyl:
m.p. < $-30°$ C., cl.p. $90°$ C., nematic; $\eta(22°$ C.$) = 22$ cP, $\eta(-20°$ C.$) = 365$ cP; $\Delta\epsilon = 8.54$; $\Delta n = 0.139$; $k_{33}k_{11} = 1.39$.

Mixture A6
5.33 wt. % of 4'-ethyl-4-cyanobiphenyl,
3.55 wt. % of 4'-propyl-4-cyanobiphenyl,
6.05 wt. % of 4'-butyl-4-cyanobiphenyl,
16.40 wt. % of p-(trans-4-pentylcyclohexyl)benzonitrile,
10.55 wt. % of 4''-pentyl-4-cyano-p-terphenyl,
8.80 wt. % of trans-4-butylcyclohexanecarboxylic acid p-ethoxyphenyl ester,
7.82 wt. % of trans-4-pentylcyclohexanecarboxylic acid p-methoxyphenyl ester,
5.00 wt. % of 4-ethoxy-1-(trans-4-propylcyclohexyl)benzene,
23.31 wt. % of 2-(trans-4-pentylcyclohexyl)-1-(p-ethoxyphenyl)ethane,
10.19 wt. % of 1-[2-(trans-4-butylcyclohexyl)ethyl]-4-(trans-4-pentylcyclohexyl)benzene,
3.00 wt. % of 4-[2-(trans-4-butylcyclohexyl)ethyl]-4'-(trans-4-pentylcyclohexyl)-1,1'-ethylenedibenzene;
m.p. < $-30°$ C., cl.p. $72°$ C., nematic; $\eta(22°$ C.$) = 21$ cP, $\eta(-20°$ C.$) = 341$ cP; $\Delta\epsilon = 7.25$; $\Delta n = 0.126$; $k_{33}/k_{11} = 1.30$.

Mixture B1
3.38 wt. % of 3-propyl-6-(trans-4-ethylcyclohexyl)pyridazine,
8.21 wt. % of 3-propyl-6-(trans-4-pentylcyclohexyl)pyridazine,
10.51 wt. % of 3-pentyl-6-(trans-4-pentylcyclohexyl)pyridazine,
5.25 wt. % of 3-propyl-6-(trans-4-heptylcyclohexyl)pyridazine,
4.27 wt. % of 2,3-dicyano-1-[2-(trans-4-pentylcyclohexyl)ethyl]-4-propylbenzene,
11.58 wt. % of trans-4-butylcyclohexanecarboxylic acid p-ethoxyphenyl ester,
16.31 wt. % of trans-4-butylcyclohexanecarboxylic acid p-pentyloxyphenyl ester,
10.47 wt. % of trans-4-pentylcyclohexanecarboxylic acid p-methoxyphenyl ester,
12.64 wt. % of trans-4-pentylcyclohexanecarboxylic acid p-propoxyphenyl ester,
7.12 wt. % of 2-(trans-4-pentylcyclohexyl)-1-(p-ethoxyphenyl)ethane,
10.26 wt. % of 4-(trans-4-pentylcyclohexyl)-4'-[2-(trans-4-butylcyclohexyl)ethyl]biphenyl;
m.p. < $-10°$ C., cl.p. $61.5°$ C., nematic; $\Delta\epsilon = -5.05$; $\eta = 42.8$ cP.

Mixture C1
3.76 wt. % of 3-propyl-6-(trans-4-ethylcyclohexyl)pyridazine,
9.15 wt. % of 3-propyl-6-(trans-4-pentylcyclohexyl)pyridazine,
11.71 wt. % of 3-pentyl-6-(trans-4-pentylcyclohexyl)pyridazine,
5.86 wt. % of 3-propyl-6-(trans-4-heptylcyclohexyl)pyridazine,
5.71 wt. % of 4'-hexyl-4-biphenylcarboxylic acid 3-chloro-4-[(3-chloro-4-cyanophenoxy)carbonyl]phenyl ester,
5.71 wt. % of 4'-heptyl-4-biphenylcarboxylic acid 3-chloro-4-[(3-chloro-4-cyanophenoxy)carbonyl]phenyl ester,
5.71 wt. % of 4'-hexyl-4-biphenylcarboxylic acid 3-chloro-4-[(3-chloro-4-nitrophenoxy)carbonyl]phenyl ester,
9.49 wt. % of trans-4-butylcyclohexanecarboxylic acid p-ethoxyphenyl ester,
13.36 wt. % of trans-4-butylcyclohexanecarboxylic acid p-pentyloxyphenyl ester,
8.58 wt. % of trans-4-pentylcyclohexanecarboxylic acid p-methoxyphenyl ester,
10.36 wt. % of trans-4-pentylcyclohexanecarboxylic acid p-propoxyphenyl ester,
5.83 wt. % of 2-(trans-4-pentylcyclohexyl)-1-(p-ethoxyphenyl)ethane,
4.77 wt. % of 4-(trans-4-pentylcyclohexyl)-4'-[2-(trans-4-butylcyclohexyl)ethyl]biphenyl;
m.p. < $-10°$ C., cl.p. $73.7°$ C., nematic; $f_c(22°$ C.$) = 3.5$ kHz, $\Delta\epsilon_l(22°$ C.$) = 5.22$, $\Delta\epsilon_h(22°$ C.$) = -5.2$; $\eta(22°$ C.$) = 67.4$ cP.

Mixture C2
3.76 wt. % of 3-propyl-6-(trans-4-ethylcyclohexyl)pyridazine,
9.15 wt. % of 3-propyl-6-(trans-4-pentylcyclohexyl)pyridazine,
11.72 wt. % of 3-pentyl-6-(trans-4-pentylcyclohexyl)pyridazine,
5.85 wt. % of 3-propyl-6-(trans-4-heptylcyclohexyl)pyridazine,
5.71 wt. % of 4'-hexyl-4-biphenylcarboxylic acid 3-chloro-4-[(3-chloro-4-cyanophenoxy)carbonyl]phenyl ester,
5.71 wt. % of 4'-hexyl-4-biphenylcarboxylic acid 3-chloro-4-[(3-chloro-4-nitrophenoxy)carbonyl]phenyl ester,
5.71 wt. % of 4'-heptyl-4-biphenylcarboxylic acid 3-chloro-4-[(3-chloro-4-nitrophenoxy)carbonyl]phenyl ester,
5.40 wt. % of trans-4-butylcyclohexanecarboxylic acid p-ethoxyphenyl ester,
4.95 wt. % of trans-4-pentylcyclohexanecarboxylic acid p-methoxyphenyl ester,
8.35 wt. % of trans-4-pentylcyclohexanecarboxylic acid p-propoxyphenyl ester,
9.06 wt. % of trans-4-pentylcyclohexanecarboxylic acid trans-4-propylcyclohexyl ester,
13.42 wt. % of 2-(trans-4-pentylcyclohexyl)-1-(p-ethoxyphenyl)ethane,
6.45 wt. % of 1-[2-(trans-4-butylcyclohexyl)ethyl]-4-(trans-4-pentylcyclohexyl)benzene
4.76 wt. % of 4-(trans-4-pentylcyclohexyl)-4'-[2-(trans-4-butylcyclohexyl)ethyl]biphenyl;
m.p. < $-10°$ C., cl.p. $70.1°$ C., nematic; $f_c(22°$ C.$) = 2.5$ kHz, $\Delta\epsilon_l(22°$ C.$) = 5.2$, $\Delta\epsilon_h(22°$ C.$) = -5.2$; $\eta(22°$ C.$) = 65$ cP.

Mixture C3
0.60 wt. % of 3-propyl-6-(trans-4-ethylcyclohexyl)pyridazine,
1.46 wt. % of 3-propyl-6-(trans-4-pentylcyclohexyl)pyridazine,
1.86 wt. % of 3-pentyl-6-(trans-4-pentylcyclohexyl)pyridazine,
0.93 wt. % of 3-propyl-6-(trans-4-heptylcyclohexyl)pyridazine,
5.83 wt. % of 4'-hexyl-4-biphenylcarboxylic acid 3-chloro-4-[(3-chloro-4-cyanophenoxy)carbonyl]phenyl ester,
5.83 wt. % of 4'-hexyl-4-biphenylcarboxylic acid 3-chloro-4-[(3-chloro-4-nitrophenoxy)carbonyl]phenyl ester,
5.83 wt. % of 4'-heptyl-4-biphenylcarboxylic acid 3-chloro-4-[(3-chloro-4-nitrophenoxy)carbonyl]phenyl ester,
8.48 wt. % of trans-4-butylcyclohexanecarboxylic acid p-ethoxyphenyl ester,
7.77 wt. % of trans-4-pentylcyclohexanecarboxylic acid p-methoxyphenyl ester, -continued 13.11 wt. % of trans-4-pentylcyclohexanecarboxylic acid p-propoxyphenyl ester,
14.22 wt. % of trans-4-pentylcyclohexanecarboxylic acid trans-4-propylcyclohexyl ester,
21.05 wt. % of 2-(trans-4-pentylcyclohexyl)-1-(p-ethoxyphenyl)ethane,
10.12 wt. % of 1-[2-(trans-4-butylcyclohexyl)ethyl]-4-(trans-4-pentylcyclohexyl)benzene,
2.91 wt. % of 4-(trans-4-pentylcyclohexyl)-4'-[2-(trans-4-butylcyclohexyl)ethyl]biphenyl;
m.p. < −10° C., cl.p. 85.1° C., nematic; $f_c$ (22° C.) = 2 kHz, $\Delta\epsilon_l$ (22° C.) = 5.2, $\Delta\epsilon_h$ (22° C.) = −2.2; $\eta$(22° C.) = 55 cP.

Mixture C4
3.66 wt. % of 3-propyl-6-(trans-4-ethylcyclohexyl)pyridazine,
8.90 wt. % of 3-propyl-6-(trans-4-pentylcyclohexyl)pyridazine,
11.39 wt. % of 3-pentyl-6-(trans-4-pentylcyclohexyl)pyridazine,
5.69 wt. % of 3-propyl-6-(trans-4-heptylcyclohexyl)pyridazine,
3.70 wt. % of 4'-hexyl-4-biphenylcarboxylic acid 3-chloro-4-[(3-chloro-4-cyanophenoxy)carbonyl]phenyl ester,
3.70 wt. % of 4'-hexyl-4-biphenylcarboxylic acid 3-chloro-4-[(3-chloro-4-nitrophenoxy)carbonyl]phenyl ester,
3.70 wt. % of 4'-heptyl-4-biphenylcarboxylic acid 3-chloro-4-[(3-chloro-4-nitrophenoxy)carbonyl]phenyl ester,
5.88 wt. % of trans-4-butylcyclohexanecarboxylic acid p-ethoxyphenyl ester,
5.39 wt. % of trans-4-pentylcyclohexanecarboxylic acid p-methoxyphenyl ester,
9.09 wt. % of trans-4-pentylcyclohexanecarboxylic acid p-propoxyphenyl ester,
9.86 wt. % of trans-4-pentylcyclohexanecarboxylic acid trans-4-propylcyclohexyl ester,
14.61 wt. % of 2-(trans-4-pentylcyclohexyl)-1-(p-ethoxyphenyl)ethane,
7.02 wt. % of 1-[2-(trans-4-butylcyclohexyl)ethyl]-4-(trans-4-pentylcyclohexyl)benzene,
7.41 wt. % of 4-(trans-4-pentylcyclohexyl)-4'-[2-(trans-4-butylcyclohexyl)ethyl]biphenyl;
m.p. < −10° C., cl.p. 70.0° C., nematic; $f_c$ (22° C.) = 3 kHz, $\Delta\epsilon_l$ (22° C.) = 2.2, $\Delta\epsilon_h$ (22° C.) = −5.2; $\eta$(22° C.) = 55 cP.

Mixture D1
98 wt. % of mixture A3.
2 wt. % of 4-nitro-4'-(4-heptyloxyphenyl)azobenzene;
m.p. < −30° C., cl.p. 38.8° C., nematic; yellow, $E_{252}$ (ethanol) = 15480, $E_{294}$ (ethanol) = 13830, $E_{390}$ (ethanol) = 28180; S = 0.820.
S = 0.770 in the host phase RO-TN-605.

Mixture D2
98 wt. % of mixture A3,
2 wt. % of 2-chloro-4-nitro-4'-(4-heptyloxyphenyl)azobenzene;
m.p. < −30° C., cl.p. 88° C., nematic; yellow, $E_{300}$ = 11580, $E_{406}$ = 25910; S = 0.791.
S = 0.747 in the host phase RO-TN-605.

Mixture D3
98 wt. % of mixture A3,
2 wt. % of 3-chloro-4'-[(p-dimethylaminophenyl)azo]-4-heptyloxyazobenzene;
nematic; red, $E_{365}$ = 15140, $E_{479}$ = 41330; S = 0.820.
S = 0.770 in the host phase RO-TN-605.

Mixture D4
98 wt. % of mixture A3
2 wt. % of 1.5-diamino-6-methyl-2-anthraquinonecarboxylic acid p-heptylphenyl ester;
nematic; red, $E_{227}$ = 15280, $E_{524}$ = 14700; S = 0.747.
S = 0.735 in the host phase RO-TN-605.

Mixture D5
98 wt. % of mixture A3
2 wt. % of 1,4-diamino-2-anthraquinonecarboxylic acid p-heptylphenyl ester;
m.p. < −20° C., cl.p. 87.3° C., nematic; blue, $E_{602}$ = 12860, $E_{638}$ = 12860; S = 0.777.
S = 0.762 in the host phase RO-TN-605.

Mixture D6
98 wt. % of mixture C1,
2 wt. % of 1,4-diamino-2-anthraquinonecarboxylic acid p-heptylphenyl ester;
m.p. < −10° C., cl.p. 74.3° C., nematic; blue, $E_{602}$ = 12860, $E_{638}$ = 12860.

Mixture D7
98 wt. % of mixture B1,
2 wt. % of 1,4-diamino-2-anthraquinonecarboxylic acid p-heptylphenyl ester;
m.p. < −10° C., cl.p. 62.2° C., nematic; blue, $E_{602}$ = 12860, $E_{638}$ = 12860.

Mixture D8
98.57 wt. % of mixture A3,
0.30 wt. % of 4-nitro-4'-(4-heptyloxyphenyl)azobenzene,
0.83 wt. % of 1,5-diamino-6-methyl-2-anthraquinonecarboxylic acid p-heptylphenyl ester,
0.30 wt. % of 3-chloro-4'-[(p-dimethylaminophenyl)azo]-4-heptyloxyazobenzene;
m.p. < −30° C., cl.p. 87° C., nematic; red.

Mixture D9
98.57 wt. % of mixture B1,
0.30 wt. % of 4-nitro-4'-(4-heptyloxyphenyl)azobenzene,
0.83 wt. % of 1,5-diamino-6-methyl-2-anthraquinonecarboxylic acid p-heptylphenyl ester,
0.30 wt. % of 3-chloro-4'-[(p-dimethylaminophenyl)azo]-4-heptyloxyazobenzene;
m.p. < −10° C., cl.p. 63° C., nematic; red.

Mixture D10
98.57 wt. % of mixture C1,
0.30 wt. % of 4-nitro-4'-(4-heptyloxyphenyl)azobenzene,
0.83 wt. % of 1,5-diamino-6-methyl-2-anthraquinonecarboxylic acid p-heptylphenyl ester,
0.30 wt. % of 3-chloro-4'-[(p-dimethylaminophenyl)azo]-4-heptyloxyazobenzene;
m.p. < −10° C., cl.p. 76° C., nematic; red.

Mixture D11
95.10 wt. % of mixture A3,
0.76 wt. % of 4-nitro-4'-(4-heptyloxyphenyl)azobenzene,
0.53 wt. % of 3-chloro-4'-[(p-dimethylaminophenyl)azo]-4-heptyloxyazobenzene,
0.76 wt. % of 1,5-diamino-6-methyl-2-anthraquinonecarboxylic acid p-heptylphenyl ester,
2.85 wt. % of 1,4-diamino-2-anthraquinonecarboxylic acid p-heptylphenyl ester;
m.p. < −20° C., cl.p. 87° C., nematic; black.

Mixture D12
94.44 wt. % of mixture A3,
0.89 wt. % of 4-nitro-4'-(4-heptyloxyphenyl)azobenzene,
0.60 wt. % of 3-chloro-4'-[(p-dimethylaminophenyl)azo]-4-heptyloxyazobenzene,
0.68 wt. % of 1,5-diamino-6-methyl-2-anthraquinonecarboxylic acid p-heptylphenyl ester,
3.39 wt. % of 1,4-diamino-2-anthraquinonecarboxylic acid p-heptylphenyl ester;
m.p. < −20° C., cl.p. 90.5° C., nematic; black.

Mixture D13
94.41 wt. % of mixture A3,
0.45 wt. % of 4-nitro-4'-(4-heptyloxyphenyl)azobenzene,
0.45 wt. % of 2-chloro-4-nitro-4'-(4-heptyloxyphenyl)azobenzene,
0.70 wt. % of 3-chloro-4'-[(p-dimethylaminophenyl)azo]-4-heptyloxyazobenzene,
0.61 wt. % of 1,5-diamino-6-methyl-2-anthraquinonecarboxylic acid p-heptylphenyl ester,
3.38 wt. % of 1,4-diamino-2-anthraquinonecarboxylic acid p-heptylphenyl ester;
m.p. < −20° C., cl.p. 90° C., nematic; black.

Mixture D14
94.44 wt. % of mixture B1
0.89 wt. % of 4-nitro-4'-(4-heptyloxyphenyl)azobenzene,
0.60 wt. % of 3-chloro-4'-[(p-dimethylaminophenyl)azo]-4-heptyloxyazobenzene,
0.68 wt. % of 1,5-diamino-6-methyl-2-anthraquinonecarboxylic acid p-heptylphenyl ester,
3.39 wt. % of 1,4-diamino-2-anthraquinonecarboxylic acid p-heptylphenyl ester;
m.p. < −10° C., cl.p. 65.5° C., nematic; black.

Mixture D15
94.44 wt. % of mixture C1,
0.89 wt. % of 4-nitro-4'-(4-heptyloxyphenyl)azobenzene,
0.60 wt. % of 3-chloro-4'-[(p-dimethylaminophenyl)azo]-4- heptyloxyazobenzene,
0.68 wt. % of 1,5-diamino-6-methyl-2-anthraquinonecarboxylic acid p-heptylphenyl ester,
3.39 wt. % of 1,4-diamino-2-anthraquinonecarboxylic acid p-heptylphenyl ester;
    m.p. < −10° C., cl.p. 77.5° C., nematic; black.
Mixture D16
94.62 wt. % of mixture A3,
0.76 wt. % of 4-nitro-4'-(4-heptyloxyphenyl)azobenzene,
0.76 wt. % of 3-chloro-4'-[(p-dimethylaminophenyl)azo]-4-heptyloxyazobenzene,
3.86 wt. % of 1,4-diamino-2-anthraquinonecarboxylic acid p-heptylphenyl ester;
    m.p. < −20° C., cl.p. 88° C., nematic; black.
Mixture D17
96.05 wt. % of mixture A6,
0.63 wt. % of 4-nitro-4'-(4-heptyloxyphenyl)azobenzene,
0.52 wt. % of 3-chloro-4'-[(p-dimethylaminophenyl)azo]-4-heptyloxyazobenzene,
0.40 wt. % of 1,5-diamino-6-formyl-2-(E-p-heptylstyryl)-anthraquinone,
2.40 wt. % of 1,4-diamino-2-anthraquinonecarboxylic acid p-heptylphenyl ester;
    m.p. < −30° C., cl.p. 75° C., nematic; black, $\lambda_{max}$ = 400–670 nm; S = 0.76–0.79; $\eta(22°$ C.) = 26 cP, $\eta(-20°$ C.) = 466 cP.
Mixture D18
94.07 wt. % of mixture A6,
0.95 wt. % of 4-nitro-4'-(4-heptyloxyphenyl)azobenzene,
0.78 wt. % of 3-chloro-4'-[(p-dimethylaminophenyl)azo]-4-heptyloxyazobenzene,
0.60 wt. % of 1,5-diamino-6-formyl-2-(E-p-heptylstyryl)-anthraquinone,
3.60 wt. % of 1,4-diamino-2-anthraquinonecarboxylic acid p-heptylphenyl ester;
    m.p. < −20° C., cl.p. 78° C., nematic; black, $\lambda_{max}$ = 400–670 nm; S = 0.76–0.79; $\eta(22°$ C.) = 29 cP, $\eta(-20°$ C.) = 588 cP.
Mixture D19
97.50 wt. % of mixture A5,
2.50 wt. % of 1,4-diamino-2-anthraquinonecarboxylic acid p-heptylphenyl ester;
    m.p. < −30° C., cl.p. 90° C., nematic; blue, $\lambda_{max}$ = 620 nm; S = 0.77; $\eta(22°$ C.) = 25 cP, $\eta(-20°$ C.) = 474 cP.
Mixture D20
96.80 wt. % of mixture A6,
3.20 wt. % of 1,4-diamino-2-anthraquinonecarboxylic acid p-heptylphenyl ester;
    m.p. < −20° C., cl.p. 76° C., nematic; blue, $\lambda_{max}$ = 620 nm; S = 0.77; $\eta(22°$ C.) = 25 cP, $\eta(-20°$ C.) = 487 cP.
Mixture D21
97.00 wt. % of mixture A6,
0.20 wt. % of 3-chloro-4'-[(p-dimethylaminophenyl)azo]-4-heptyloxyazobenzene,
2.80 wt. % of 1,4-diamino-2-anthraquinonecarboxylic acid p-heptylphenyl ester;
    m.p. < −20° C., cl.p. 72° C., nematic; dark blue, $\lambda_{max}$ = 600 nm; S = 0.78; $\eta(22°$ C.) = 25 cP, $\eta(-20°$ C.) = 456 cP.
Mixture D22
97.00 wt. % of mixture A6,
3.00 wt. % of 4-nitro-4'-(4-heptyloxyphenyl)azobenzene;
    m.p. < −20° C., cl.p. 77° C., nematic; yellow, $\lambda_{max}$ = 400 nm; S = 0.78; $\eta(22°$ C.) = 22 cP, $\eta(-20°$ C.) = 390 cP.
Mixture D23
99.05 wt. % of mixture A6,
0.80 wt. % of 3-chloro-4'-[(p-dimethylaminophenyl)azo]-4-heptyloxyazobenzene,
0.15 wt. % of 1,5-diamino-6-formyl-2-(E-p-heptylstyryl)-anthraquinone;
    m.p. < −20° C., cl.p. 74° C., nematic; red, $\lambda_{max}$ = 490 nm, S = 0.79; $\eta(22°$ C.) = 22 cP, $\eta(-20°$ C.) = 385 cP.
Mixture D24
97.00 wt. % of mixture A6,
2.00 wt. % of 4-nitro-4'-(4-heptyloxyphenyl)azobenzene,
1.00 wt. % of 1,4-diamino-2-anthraquinonecarboxylic acid p-heptylphenyl ester;
    m.p. < −20° C., cl.p. 76° C., nematic; green, $\lambda_{max}$ = 400 nm, S = 0.78; $\eta(22°$ C.) = 23 cP, $\eta(-20°$ C.) = 426 cP.
Mixture D25
96.05 wt. % of mixture A5,
0.63 wt. % of 4-nitro-4'-(4-heptyloxyphenyl)azobenzene,
0.52 wt. % of 3-chloro-4'-[(p-dimethylaminophenyl)azo]-4-heptyloxyazobenzene,
0.40 wt. % of 1,5-diamino-6-formyl-2-(E-p-heptylstyryl)-anthraquinone,
2.40 wt. % of 1,4-diamino-2-anthraquinonecarboxylic acid p-heptylphenyl ester;
    m.p. < −30° C., cl.p. 91° C., nematic; black $\lambda_{max}$ = 400–670 nm; S = 0.76–0.79; $\eta(22°$ C.) = 28 cP, $\eta(-20°$ C.) = 548 cP.

The following chemical Examples 1 through 7 illustrate the preparation of the inventive compounds having formulae I–IV and IVa as well as the preparation of certain starting materials. C signifies a crystalline phase, S signifies a smectic phase, N signifies a nematic phase and I signifies the isotropic phase. Unless otherwise stated, percentages and ratios relating to solvent mixtures are expressed in volume, purity data determined by gas chromatography are expressed in area %, and the remaining percentages and ratios are expressed in weight. Temperatures are in degrees Celsius (°C.), normal pressure is about 1 atmosphere, and room temperature is about 23° C. Unless indicated otherwise, the Examples were carried out as written.

EXAMPLE 1

2.20 g of 4-(trans-4-pentylcyclohexyl)-4'-[2-(trans-4-pentylcyclohexyl)vinyl]biphenyl were suspended in toluene/ethanol (3:2) in a sulphonation flask, treated with 200 mg of palladium/carbon (10%) and hydrogenated at normal pressure and 50° C. until the hydrogen uptake came to a standstill. Filtration of the mixture and concentration of the filtrate gave a white semi-crystalline residue which, after recrystallization from 100 ml of hexane, yielded 1.55 g of 4-(trans-4-pentylcyclohexyl)-4'-[2-(trans-4-pentylcyclohexyl)ethyl]biphenyl as colourless needles; transition (presumably S-S) 219.5° C., transition S-N 243.2° C., cl.p. (N-I) 256.1° C. This substance was found to be very strongly super-coolable; upon cooling to room temperature it still did not crystallize. Rf-value (hexane): 0.32.

The 4-(trans-4-pentylcyclohexyl)-4'-[2-(trans-4-pentylcyclohexyl)vinyl]biphenyl used as the starting material was prepared as follows:

a. A solution of 10.0 g of 4'-(trans-4-pentylcyclohexyl)-4-biphenylcarbonitrile in 150 ml of methylene chloride was placed at −35° C. in a sulphonation flask under argon gasification and treated within 8 minutes with 40 ml of an about 1.5N solution of diisobutylaluminium hydride in toluene. After completion of the addition, the mixture was stirred for 2 hours at −35° C. and then for a further 1.5 hours while gradually warming to 0° C. The mixture was then treated cautiously with 100 ml of 1N sulphuric acid and extracted three times with 150 ml of diethyl ether each time. The organic phases were washed once with 100 ml of 1N sulphuric acid, twice with 100 ml of water each time and once with 100 ml of saturated sodium chloride solution, dried over magnesium sulphate and concentrated. This yielded 9.5 g (95%) of 4'-(trans-4-pentylcyclohexyl)-4-biphenylcarboxaldehyde as a colourless crystalline mass (m.p. 115°–116° C.) which was used in the following step without additional purification. Rf-values [toluene/ethyl acetate (19:1): educt 0.65, product 0.52.

b. A mixture of 930 mg of lithium aluminium hydride in 100 ml of absolute tetrahydrofuran was placed at 0° C. in a sulphonation flask and treated within 20 minutes with a solution of 8.2 g of 4'-(trans-4-pentylcyclohexyl)-4-biphenylcarboxaldehyde in 100 ml of absolute tetrahydrofuran. After completion of the addition, the mixture was stirred for another 2 hours while warming to room temperature, subsequently quenched cautiously with 100 ml of 1N sulphuric acid and extracted three times with 200 ml of methylene chloride each time. The organic phases were washed twice with 100 ml of water each time, dried over magnesium sulphate and concentrated. This yielded 7.90 g (96%) of 4'-(trans-4-pentylcyclohexyl)-4-biphenylmethanol as a colourless crystalline mass (purity 99.4% according to gas chromatography) which was used in the following step without additional purification. M.p. 180.4° C.; Rf-values [petroleum ether/ethyl acetate (9:1)]: educt 0.70, product 0.30.

c. A mixture of 3.5 g of 4'-(trans-4-pentylcyclohexyl)-4-biphenylmethanol and 2.9 g of triphenylphosphine in 150 ml of absolute methylene chloride was placed at −20° C. in a sulphonation flask under argon gasification and treated portionwise within 10 minutes with 3.8 g of solid tetrabromomethane. Partially undissolved educt dissolved slowly. The mixture was stirred for a further 2 hours while warming to room temperature. The mixture was subsequently concentrated on a rotary evaporator and the crystalline residue was suspended in 300 ml of warm hexane, separated triphenylphosphine oxide was removed by filtration (rinsing with hexane) and the filtrate was concentrated. Low-pressure chromatography (0.7 bar) of the residue on silica gel with toluene as the eluent yielded 3.39 g (82%) of 4-bromomethyl-4'-(trans-4-pentylcyclohexyl)bisphenyl as colourless crystals. This material was used in the following step without additional purification. Rf-value of the product [petroleum ether/ethyl acetate (97:3]: 0.47.

d. A mixture of 2.63 g of 4-(bromomethyl)-4'-(trans-4-pentylcyclohexyl)biphenyl and 2.2 g of triphenylphosphine in 150 ml of o-xylene was heated to reflux (bath temperature 160° C.) for 15 hours in a sulphonation flask under argon gasification. After cooling, the white precipitate formed was filtered off, washed several times with benzene and dried in a high vacuum (0.1 mmHg) at 80° C. for 1 hour. There were obtained 3.48 g (80%) of [[4'-(trans-4-pentylcyclohexyl)-4-biphenylyl]methyl]triphenylphosphonium bromide as a white powder (m.p. 263°–265° C.) which was used in the following Wittig reaction without additional purification.

e. A mixture of 3.31 g of [[4'-(trans-4-pentylcyclohexyl)-4-biphenylyl]methyl]triphenylphosphonium bromide in 50 ml of t-butyl methyl ether was placed at 0° C. in a sulphonation flask under argon gasification and treated with 617 mg of solid potassium t-butylate. After completion of the addition, the mixture was stirred for 15 minutes at 0° C. (a deep orange colouration resulting) and then treated within 10 minutes at 0° C. with a solution of 912 mg of trans-4-pentylcyclohexanecarboxaldehyde in 20 ml of t-butyl methyl ether. The mixture was stirred for a further 30 minutes at 0° C. and for 90 minutes at room temperature and then the yellow mixture was poured into 150 ml of water and extracted three times with 150 ml of diethyl ether each time. The organic phases were washed twice with 100 ml of water each time, dried over magnesium sulphate and concentrated. Low-pressure chromatography (0.7 bar) of the residue on silica gel with toluene as the eluent gave 2.43 g (100%) of 4-(trans-4-pentylcyclohexyl)-4'-[2-(trans-4-pentylcyclohexyl)vinyl]biphenyl as a colourless crystalline mass. This material was used in the hydrogenation without additional purification. Rf-values of the product (hexane): 0.29 and 0.32 (cis/trans mixture).

The following compounds can be prepared in an analogous manner:

4-(Trans-4-pentylcyclohexyl)-4'-[2-(trans-4-propylcyclohexyl)ethyl]biphenyl; transition (S-S) 208.1° C., transition S-N 234.0° C., cl.p. (N-I) 263.5° C.;

4-(trans-4-pentylcyclohexyl)-4'-[2-(trans-4-butylcyclohexyl)ethyl]biphenyl; transition S-S 215.9° C., transition S-N 240° C., cl.p. (N-I) 259° C.;

4-[2-(trans-4-butylcyclohexyl)ethyl]-4'-(trans-4-propylcyclohexyl)-1,1'-ethylenedibenzene; m.p. (C-S) 68.9° C., transition S-S 117.5° C., transition S-N 171.5° C., cl.p. (N-I) 187.3° C.;

4-[2-(trans-4-butylcyclohexyl)ethyl]-4'-(trans-4-pentylcyclohexyl)-1,1'-ethylenedibenzene; m.p. (C-S) 48.0° C., cl.p. (S-I) 188.0° C.;

4-(trans-4-pentylcyclohexyl)-4'-[2-(p-(trans-4-butylcyclohexyl)phenyl)ethyl]biphenyl; m.p. 65° C., cl.p. 331.6° C.;

4-(trans-4-pentylcyclohexyl)-4'-[2-(p-(trans-4-pentylcyclohexyl)phenyl)ethyl]biphenyl; cl.p. 323.5° C.;

4-(trans-4-pentylcyclohexyl)-4'-(trans-4-propylcyclohexyl)-1,1'-ethylenedibenzene; m.p. (C-S) 116.8° C., transition S-N 198.5° C., cl.p. (N-I) 221.9° C.;

4-pentyl-4''-[2-(trans-4-butylcyclohexyl)ethyl]-p-terphenyl; m.p. (C-S) 149.8° C., transition S-S 215.5° C., transition S-N 263° C., cl.p. (N-I) 267° C.;

4-[2-(trans-4-butylcyclohexyl)ethyl]-4'-(p-pentylphenyl)-1,1'-ethylenedibenzene; m.p. (C-S) 0° C., transition S-S 76.5° C., cl.p. (S-I) 194° C.;

1-[2-(trans-4-butylcyclohexyl)ethyl]-4-(trans-4-pentylcyclohexyl)benzene; m.p. (C-S) 28.1° C., cl.p. (S-I) 138.4° C.;

1-[2-(trans-4-pentylcyclohexyl)ethyl]-4-(trans-4-propylcyclohexyl)benzene; m.p. (C-S) 40.2° C., transition S-N 126° C., cl.p. (N-I) 132.7° C.;

1-[2-(trans-4-butylcyclohexyl)ethyl]-4-[2-(trans-4-pentylcyclohexyl)ethyl]benzene; m.p. (C-S) 10.4 and 21.6° C. (2 modifications), cl.p. (S-I) 125.8° C.

EXAMPLE 2 a. A suspension of 2.14 g of 4,4'-bis(hydroxymethyl)-biphenyl (prepared by reducing biphenyl-4,4'-dicarboxylic acid dimethyl ester with lithium aluminium hydride) and 5.5 g of triphenylphosphine in 60 ml of methylene chloride was placed at −10° C. in a sulphonation flask under argon gasification and treated within 3 minutes with 7.3 g of tetrabromoethane. After completion of the addition, the mixture was stirred for a further 16 hours while gradually warming to +10° C. and then, after concentration on a rotary evaporator, the residue was triturated with hot benzene. Filtration and concentration of the filtrate gave 12.67 g of crude product which, after low-pressure chromatography (0.5 bar) with toluene on silica gel, yielded 2.60 g (76%) of 4,4'-bis(bromomethyl)biphenyl. A recrystallization from 50 ml of acetone gave 1.78 g of the dibromide as colourless crystals of melting point 172.8° C. Rf-value [hexane/toluene (2:1)]: 0.41.

b. 122 mg of magnesium shavings were covered with 3 ml of absolute tetrahydrofuran in a sulphonation flask under argon gasification, and, after the addition of a crystal of iodine, treated with a solution of 1.24 g of trans-1-(bromomethyl)-4-pentylcyclohexane in 7 ml of absolute tetrahydrofuran. After completion of the addition, the mixture was heated to reflux for another 30 minutes and then the mixture, cooled to −78° C., was treated with 0.7 ml of a 0.1N solution of dilithium tetrachlorocuprate in tetrahydrofuran and subsequently with a solution of 670 mg of 4,4'-bis(bromomethyl)-biphenyl in 10 ml of absolute tetrahydrofuran. The yellow colouration which appeared initially disappeared after a few minutes. The mixture, warmed to −15° C., was subsequently stirred for a further 17 hours, then treated with 25 ml of 2N hydrochloric acid and extracted three times with 50 ml of diethyl ether each time. The organic phases were washed with 50 ml of saturated sodium chloride solution, dried over magnesium sulphate and concentrated. Low-pressure chromatography (0.5 bar) of the residue (1.06 g) on silica gel with hexane and subsequently with hexane/diethyl ether (19:1) as the eluent gave in sequence 1,1'-ethylene-bis(trans-4-pentylcyclohexane), 228 mg (22%) of 4,4'-bis[2-(trans-4-pentylcyclohexyl)ethyl]biphenyl, 78 mg (9%) of 4-(bromomethyl)-4'-[2-(trans-4-pentylcyclohexyl)ethyl]biphenyl as well as 4,4'-bis(bromomethyl)-biphenyl. A single crystallization of the 228 mg of 4,4'-bis[2-(trans-4-pentylcyclohexyl)ethyl]biphenyl from hexane yielded 194 mg of colourless needles having a clearing point above 300° C. (further phase transitions at 68° C., 84° C., 161° C., 203° C., 221° C. and 224° C.). Rf-values (hexane): 4,4'-bis(bromomethyl)biphenyl 0.14; 4-(bromomethyl)-4'-[2-(trans-4-pentylcyclohexyl)ethyl]biphenyl 0.24; 4,4'-bis[2-(trans-4-pentylcyclohexyl)ethyl]biphenyl 0.40.

EXAMPLE 3 a. 138.1 g of 4-nitroaniline were dissolved in 600 ml of semi-concentrated hydrochloric acid while warming. The solution was cooled to room temperature and treated with 800 g of ice, whereupon a precipitate separated and the temperature dropped to −10° C. 76.0 g of sodium nitrite (90%) were added to the mixture while cooling with an ice-bath, whereupon the temperature rose to 2° C. and the precipitate dissolved almost completely within 5 minutes. The diazonium salt solution obtained was stirred at 2° C. for another 15 minutes and stored in an ice-bath until used.

b. 121.2 g of N,N-dimethylaniline were dissolved in 400 ml of glacial acetic acid, cooled to 5° C. and treated dropwise at 5°–14° C. (ice-bath cooling) within 30 minutes with the diazonium salt solution prepared according to paragraph (a). A brown-red precipitate separated. The mixture was stirred at 5° C. for 30 minutes and then treated portionwise within 25 minutes with 300 g of sodium acetate. The mixture was subsequently treated with 100 ml of ethanol, stirred for 30 minutes at 5° C. and for a further 90 minutes at room temperature, treated with 2 l of water and suction filtered. The residue was washed with 500 ml of water and dried in vacuo at 50° C., yielding 264.3 g of 4-nitro-4'-(dimethylamino)azobenzene.

c. A suspension of 88.1 g of 4-nitro-4'-(dimethylamino)azobenzene in 1080 ml of ethanol was heated to slight reflux while stirring, treated dropwise within 35 minutes with 1017 g of 25% sodium hydrogen sulphide solution and then stirred at slight reflux for another 1 hour. The mixture was cooled to room temperature, treated with 2120 ml of water and suction filtered. The residue was washed with water/ethanol (vol. 3:1) and dried at 50° C. in vacuo, yielding 55.7 g of 4-amino-4'-(dimethylamino)azobenzene; m.p. 182.5°–187.4° C.

d. 48.0 g of 4-amino-4'-(dimethylamino)azobenzene were dissolved in 111 ml of semi-concentrated hydrochloric acid while warming. The solution was cooled and treated dropwise at −3° to 0° C. while stirring within 10 minutes with 80.4 ml of 2.5M solution nitrite solution. The diazonium salt solution obtained was stirred at −3° to 0° C. for another 15 minutes, then treated with 6.0 g of urea and stored in a cooling bath until used.

e. A solution of 25.7 g of o-chlorophenol in 203 ml of 2N sodium hydroxide was cooled to 5° C. and treated dropwise while stirring at 0° to 8° C. within 15 minutes with the diazonium salt solution prepared in paragraph (d). In order to keep the mixture alkaline during the entire reaction, a further 65 ml of 2N sodium hydroxide were now added. The mixture was subsequently stirred for another 1 hour at 2° C., then left to warm to 15° C. and suction filtered. The residue was washed with 200 ml of water and dried in vacuo. The dark brown crystals obtained (68.1 g) were recrystallized from methylene chloride/hexane, there being obtained 51.8 g of 3-chloro-4'-[(p-dimethylaminophenyl)azo]-4-hydroxyazobenzene.

f. A mixture of 51.8 g of 3-chloro-4'-[(p-dimethylaminophenyl)azo]-4-hydroxyazobenzene, 570 ml of ethanol, 24.3 g of 1-bromoheptane, a spatula tip of sodium iodide and 19.5 g of potassium carbonate was boiled at reflux while stirring for 40 hours, the reaction being followed by thin-layer chromatography and a further 5.0 g of 1-bromoheptane and 5.3 g of potassium carbonate being added after a reaction time of 23 hours. The mixture was subsequently cooled to room temperature and suction filtered. The residue was washed with ethanol and dried in vacuo at 60° C. The red-brown crystals obtained (82.9 g) were chromatographed on silica gel with methylene chloride as the eluent and subsequently recrystallized from methylene chloride/hexane. There were thus obtained 41.6 g of 3-chloro-4'-[(p-dimethylaminophenyl)azo]-4-heptyloxyazobenzene as purple crystals; m.p. (C-N) 146.3°–146.8° C., cl.p. (N-I) 234.0°–234.3° C.; $E_{365}=15140$, $E_{479}=41330$.

EXAMPLE 4 a. 50.0 g of potassium persulphate were added at room temperature while stirring to 55.8 ml of concentrated sulphuric acid and the mixture was stirred for a further 1 hour. The colourless suspension was then poured on to 900 g of ice and treated portionwise while stirring with potassium carbonate (149.3 g) until a pH-value of 5.2 had been reached. The cold suspension was suction filtered and the filtrate was warmed to room temperature and treated dropwise while stirring within 20 minutes with a solution of 7.3 g of 2-chloro-4-nitroaniline in 50 ml of dioxan, whereupon immediate yellow colouration and formation of a precipitate occurred. The mixture was stirred at room temperature for 20 hours, suction filtered and the residue was washed with water and dried at 60° C. in vacuo. The brown crystals obtained (6.4 g) were chromatographed on silica gel with toluene/hexane (vol. 1:1) as the eluent, there being obtained 3.4 g of 2-chloro-4-nitro-1-nitrosobenzene as brown crystals.

b. A suspension of 0.840 g of 2-chloro-4-nitro-1-nitrosobenzene in 20 ml of glacial acetic acid was heated to 70° C. and treated while stirring with a solution, heated to 110° C., of 0.926 g of 4-amino-4'-hydroxybiphenyl [prepared according to Chem. Berichte 27 (1894) 2627] in 43 ml of glacial acetic acid. The dark solution was stirred at 70° C. for a further 2.25 hours, then cooled to room temperature and extracted with methylene chloride. The extracts were washed with water, 10% sodium hydrogen carbonate solution and again with water, dried over sodium sulphate and concentrated in vacuo. Thus yielding 1.3 g of crude 2-chloro-4-nitro-4′-(4-hydroxyphenyl)azobenzene as brown crystals.

c. A mixture of 1.3 g of crude 2-chloro-4-nitro-4-(4-hydroxyphenyl)azobenzene, 20 ml of ethanol, 0.658 g of 1-bromoheptane, 0.528 g of potassium carbonate and a spatula tip of sodium iodide was boiled at reflux while stirring for 22 hours. The brown suspension was subsequently concentrated in vacuo and the residue was chromatographed on silica gel with toluene/hexane as the eluent. Recrystallization from methylene chloride/hexane, yielded 0.863 g of 2-chloro-4-nitro-4′-(4-heptyloxyphenyl)-azobenzene as orange crystals; m.p. (C-N) 83.1°–83.7° C., cl.p. (N-I) 179.4°–179.8° C.; $E_{300}=11580$, $E_{406}=25910$.

EXAMPLE 5 a. 50 ml of fuming sulphuric acid (containing 65% sulphur trioxide) were cooled to 0° C. While stirring there were introduced within 5 minutes into the sulphuric acid 1.04 g of 2,6-dimethyl-1,5-dinitroanthraquinone [prepared according to H. Hopf et. al., Annalen der Chemie 585 (1954) 161]. The mixture was stirred at 0° C. for 5 minutes and then introduced portionwise into 500 g of ice. The mixture was subsequently stirred for another 1 hour, then suction filtered and the residue was washed with water and dried in vacuo at 50° C. Thus 0.920 g of crude 6-methyl-5-nitro-1,2-isoxazoleanthraquinone as black crystals was obtained.

b. A mixture of 0.920 g of crude 6-methyl-5-nitro-1,2-isoxazoleanthraquinone and 5.0 g of 4-heptylphenol was heated to 80° C. while stirring, then treated with 1.0 g of potassium cyanide and stirred for a further 15 minutes at 80° C. The temperature was subsequently increased to 100° C. and the mixture was stirred for a further 4 hours. After cooling to room temperature, the mixture was treated with 30 ml of water and stirred for 15 minutes, then poured into 200 ml of water and extracted with chloroform. The extracts were washed with water, 3N hydrochloric acid and again with water and dried over sodium sulphate. The dark oil obtained (5.1 g) was purified by chromatography on silica gel with methylene chloride/hexane (vol. 1:1) and methylene chloride as the eluent. Recrystallization from methylene chloride/hexane, yielded 0.530 g of 1-amino-6-methyl-5-nitro-2-anthraquinonecarboxylic acid p-heptylphenyl ester as purple crystals; m.p. 257.0°–259.2° C.; $E_{304}=7250$, $E_{507}=10030$.

c. A suspension of 0.426 g of 1-amino-6-methyl-5-nitro-2-anthraquinonecarboxylic acid p-heptylphenyl ester, 50 ml of toluene, 50 ml of ethanol and 0.10 g of palladium/barium carbonate catalyst poisoned with 2 wt.% lead was hydrogenated at room temperature until the hydrogen uptake came to a standstill. The mixture was filtered. The filtrate was concentrated in vacuo and the residue was purified by chromatography on silica gel with methylene chloride as the eluent. Recrystallization from methylene chloride/hexane, yielded 0.334 of 1,5-diamino-6-methyl-2-anthraquinonecarboxylic acid p-heptylphenyl ester as violet crystals; m.p. (C-N) 163.7°–165.7° C., cl.p. (N-I) 190.9°–191.4° C., nematic; $E_{277}=15280$, $E_{524}=14700$.

EXAMPLE 6 a. 23.8 g of 1,5-diaminoanthraquinone were dissolved at room temperature and while stirring within 15 minutes in 238 ml of concentrated sulphuric acid. The dark solution was then allowed to flow while stirring into 4760 ml of water. The precipitate obtained was filtered off under suction, washed with water and then suspended in 2023 ml of water in a sulphonation flask under nitrogen. The suspension was stirred well for 30 minutes, then treated with 107.1 ml of 45% sodium hydroxide solution, warmed to 40° C., treated with 59.5 g of sodium dithionite (85%) and stirred for a further 45 minutes at 40°–41° C. The solution obtained was treated with a mixture of 21.18 ml of 37% formaldehyde solution (0.2818 mol) and 190.4 ml of water, heated to 80° C. within 40 minutes and held at 80°–81° C. for another 3 minutes. The mixture was treated without further heating with 428 ml of 13% sodium hypochlorite solution via a dropping funnel rinsed with nitrogen (the internal temperature rising to 93° C.), then cooled to room temperature and suction filtered. The residue was washed with water until the filtrate was neutral and then dried in vacuo over potassium hydroxide. The yield was 23.7 g of 1,5-diamino-2,6-dimethylanthraquinonein the form of red-brown crystals.

b. 0.340 g of 1,5-diamino-2,6-dimethylanthraquinone was suspended in 50 ml of chloroform and the suspension was treated with 20 ml of nitrobenzene, 0.5 ml of aniline and 0.5 g of potassium carbonate. The chloroform was removed by evaporation and the mixture was heated at the reflux temperature of the nitrobenzene for 2 hours. Since no reaction took place, the mixture was left to cool overnight, then transferred into a sulphonation flask, rinsed with 2.0 ml of aniline and treated with 2.0 g of potassium carbonate. The mixture was subsequently boiled at reflux for 95 minutes in an oil-bath (245° C.) while stirring and gassing with nitrogen, then left to cool to room temperature, rinsing into a round flask with 50 ml of toluene and steam-distilled for 75 minutes. The distillate was discarded. The still hot suspension (residue) was suction filtered and rinsed with water. The residue was dried in vacuo at 60° C., there being obtained 0.606 g of black-violet crystals. This crude product was boiled at reflux in 600 ml of toluene for 1 hour and then suction filtered while hot (rinsing with about 100 ml of toluene). The residue was dried in vacuo at 60° C. and gave 0.157 g of dark violet crystals. The filtrate was concentrated in vacuo, the residue was heated to boiling in 30 ml of toluene, left to cool, treated with 200 ml of hexane and suction filtered. The residue was dried in vacuo at 60° C., yielding 0.352 g of product in the form of dark violet crystals. The filtrate was evaporated to give 97 mg of violet crystals which were chromatographed on silica gel with chloroform, yielding another 55 mg of product. Yield: 0.407 g (71.7%) of 1,5-diamino-2,6-bis(phenyliminomethyl)anthraquinone in the form of dark violet crystals.

c. 0.625 g of 1,5-diamino-2,6-bis(phenyliminomethyl)-anthraquinone was dissolved in 10 ml of concentrated sulphuric acid, treated dropwise with water (about 1.5 ml) while stirring until the internal temperature had reached 70° C. and stirred for a further 30 minutes. While cooling with a water-bath 30 ml of water were added dropwise to the mixture in such a manner that the temperature did not rise above 65° C. The mixture was stirred for a further 10 minutes and then suction filtered. The residue was washed neutral with 100 ml of water, rinsed with 20 ml of diethyl ether and dried first in vacuo at 60° C. and then in a high vacuum at 80° C. Yield: 0.381 g (92.1%) of crude 1,5-diamino-2,6-diformylanthraquinone in the form of dark violet crystals.

d. 51 mg of 1,5-diamino-2,6-diformylanthraquinone were suspended in 50 ml of dioxan, treated with 92 mg of p-heptylbenzyl-triphenyphosphonium bromide and 48 mg of finely powdered potassium carbonate and heated to slight reflux under nitrogen for 44 hours. In each case after 18, 22, 24 and 42 hours, another 23 mg of p-heptylbenzyl-triphenylphosphonium bromide were added to the mixture and after 42 hours an additional 40 mg of finely powdered potassium carbonate was added. The mixture was subsequently left to cool and evaporated to dryness in vacuo. The residue was taken up in 20 ml of methylene chloride and chromatographed on silica gel with methylene chloride. There were thus obtained 46 mg (41.5%) of 1,5-diamino-2,6-bis(E-p-heptylstyryl)anthraquinone as dark violet crystals and 21 mg (26.0%) of 1,5-diamino-6-formyl-2-(E-p-heptylstyryl)anthraquinone as dark violet crystals. The latter were recrystallized from chloroform/hexane; m.p. 157°–162° C., cl.p. >290° C.; $E_{352}=8790$, $E_{533}=19950$

EXAMPLE 7

A mixture of 1.5 g of 1,5-diamino-2,6-diformylanthrachinone and 1500 ml of dry toluene was heated to reflux for 30 minutes while stirring and gassing with nitrogen. A suspension of 2.7 g of p-heptylbenzyl-triphenylphosphonium bromide, 200 ml of dry toluene and 0.62 g of potassium t-butylate was subsequently added to the hot mixture. The reaction mixture was stirred for a further 10 minutes, then left to cool to 80° C. and suction filtered. The residue was discarded and the filtrate was purified by chromatography on silica gel and recrystallization from chloroform/hexane. Yield: 0.87 g (36.5%) of 1,5-diamino-6-formyl-2-(E-p-heptylstyryl)anthraquinone as dark violet crystals; m.p. (C-S) 157.1° C., cl.p. (S-I) 288.0° C.; $E_{352}=8790$, $E_{533}=19950$.

We claim:

1. A liquid crystalline mixture comprising
   a. at least one compound of the formula:

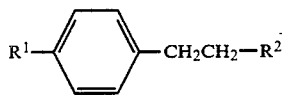

wherein $R^1$ is alkyl, alkoxy, p-alkylphenyl, p-alkoxyphenyl, trans-4-alkylcyclohexyl, 4'-alkyl-4-biphenylyl, p-(trans-4-alkylcyclohexyl)phenyl, 2-(trans-4-alkylcyclohexyl)ethyl or p-[2-(trans-4-alkylcyclohexyl)ethyl]phenyl and $R^2$ is trans-4-alkylcyclohexyl; or $R^1$ is trans-4-alkylcyclohexyl and $R^2$ is p-(trans-4-alkylcyclohexyl)phenyl, p-[2-(trans-4-alkylcyclohexyl)ethyl]phenyl or 4'-(trans-4-alkylcyclohexyl)-4-biphenylyl; or $R^1$ is p-alkylphenyl and $R^2$ is p-[2-(trans-4-alkylcyclohexyl)ethyl]phenyl; and the alkyl and alkoxy groups in the substituents $R^1$ and $R^2$ are straight-chain groups of 1 to 7 carbon atoms, and;
   b. at least one dichroic colouring substance selected from the group of compounds consisting of:

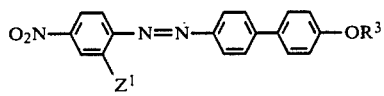

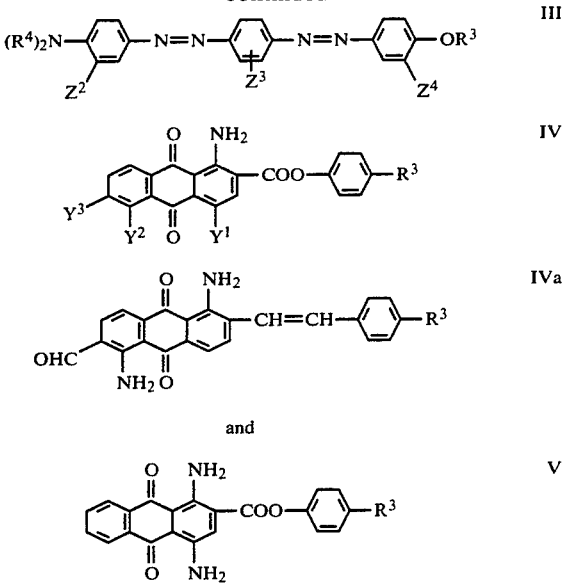

wherein $R^3$ is straight-chain $C_1$–$C_{12}$-alkyl and $R^4$ is straight-chain $C_1$–$C_4$-alkyl, $Z^1$ is hydrogen or chlorine, one of the symbols $Z^2$, $Z^3$ and $Z^4$ is chlorine and the other two are hydrogen, and $Y^1$ is hydrogen, $Y^2$ is an amino group and $Y^3$ is methyl or $Y^1$ is hydroxy and $Y^2$ and $Y^3$ are hydrogen.

2. The liquid crystalline mixture of claim 1, wherein the colouring substance is about 0.2 to about 12 wt.% of the total weight of the mixture.

3. The liquid crystalline mixture of claim 1, wherein the compound of formula V is about 0.2 to about 6 wt.% of the total weight of the mixture.

4. The liquid crystalline mixture of claim 1, wherein the compound of formula IV is about 0.2 to about 4 wt.% of the total weight of the mixture.

5. The liquid crystalline mixture of claim 1, wherein the compound of formula IVa is about 0.2 to about 4 wt.% of the total weight of the mixture.

6. The liquid crystalline mixture of claim 1, wherein the compound of formula III is about 0.2 to about 4 wt.% of the total weight of the mixture.

7. The liquid crystalline mixture of claim 1, wherein the compound of formula II is about 0.2 to about 8 wt.% of the total weight of the mixture.

8. The liquid crystalline mixture of claim 1, wherein the coloring substance comprises:
   a. at least one compound of formula II;
   b. at least one compound of formula III, IV or IVa; and
   c. at least one compound of formula V.

9. The liquid crystalline mixture of claim 8, wherein the coloring substance is about 0.1 to about 0.4 part by weight of the compound of formula II per part by weight of the compound of formula V; and about 0.2 to about 0.6 part by weight of at least one compound of formulae III, IV or IVa per part by weight of the compound of formula V.

10. The liquid crystalline mixture of claim 1, wherein $R^3$ is a straight-chain $C_5$–$C_9$-alkyl, $R^4$ is methyl or ethyl, $Z^4$ is chlorine, and $Z^2$ and $Z^3$ are hydrogen.

11. The liquid crystalline mixture of claim 1, wherein the total amount of formula I compounds is about 7 to about 90 wt.% of the total weight of the mixture.

12. The liquid crystalline mixture of claim 1, wherein $R^1$ is alkyl, alkoxy, trans-4-alkylcyclohexyl, 4'-alkyl-4-biphenylyl or p-(trans-4-alkylcyclohexyl)phenyl and $R^2$ is trans-4-alkylcyclohexyl.

13. The liquid crystalline mixture of claim 1, wherein $R^1$ is trans-4-alkylcyclohexyl and $R^2$ is p-[2-(trans-4-alkylcyclohexyl)ethyl]phenyl or 4'-(trans-4-alkylcyclohexyl)-4-biphenylyl.

14. The liquid crystalline mixture of claim 1 further comprising at least one compound selected from the group of compounds consisting of:

 XXIV

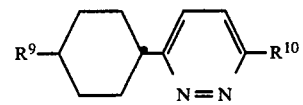 XXV

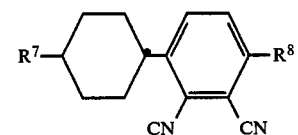 XXVI

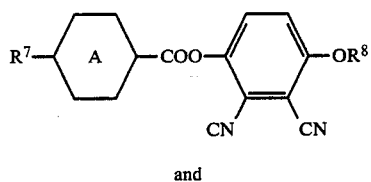 XXVII and

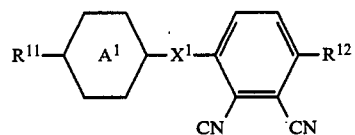 XXVIII wherein $R^7$ and $R^8$ are straight-chain $C_1$–$C_7$-alkyl and ring A is 1,4-phenylene or trans-1,4-cyclohexylene; $R^9$ is straight-chain $C_1$–$C_{12}$-alkyl and $R^{10}$ is straight-chain $C_1$–$C_{10}$-alkyl, $C_2$–$C_{10}$-1-alkynyl, $C_1$–$C_{10}$-alkoxy, p-($C_1$–$C_{10}$-alkyl)phenyl, p-($C_1$–$C_{10}$-alkoxy)-phenyl or trans-4-($C_1$–$C_{10}$-alkyl)cyclohexyl; $R^{11}$ and $R^{12}$ are straight-chain $C_1$–$C_{12}$-alkyl or if positioned on an aromatic ring $R^{11}$ and $R^{12}$ may also be straight-chain $C_1$–$C_{12}$-alkoxy, or one of $R^{11}$ and $R^{12}$ may also be a group of the formula:

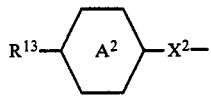 XXIX wherein $X^1$ and $X^2$ are independently single covalent bonds or one of $X^1$ and $X^2$ may also be —CH$_2$CH$_2$—; rings $A^1$ and $A^2$ are 1,4-phenylene or, when $X^1$ or $X^2$ is —CH$_2$CH$_2$—, rings $A^1$ and $A^2$ may also be trans-1,4-cyclohexylene; and $R^{13}$ is straight-chain $C_1$–$C_{12}$-alkyl or if positioned on an aromatic ring $A^2$, $R^{13}$ may also be straight-chain $C_1$–$C_{12}$-alkoxy.

15. The liquid crystalline mixture of claim 1 further comprising at least one compound selected from the group of compounds consisting of:

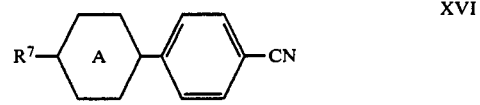 XVI

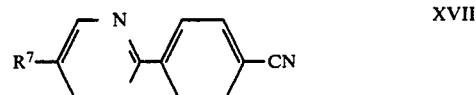 XVII

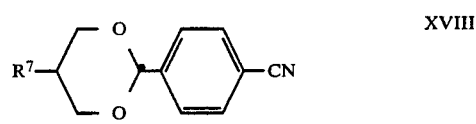 XVIII

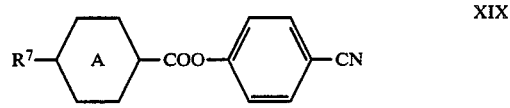 XIX

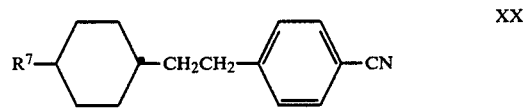 XX

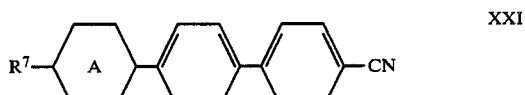 XXI

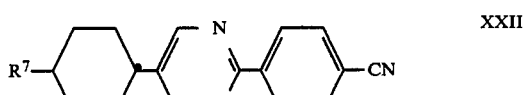 XXII

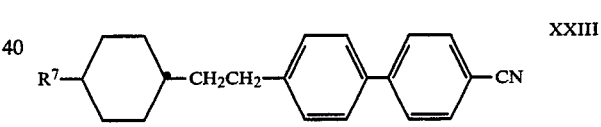 XXIII and

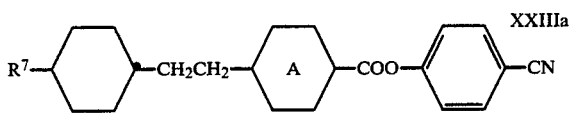 XXIIIa wherein $R^7$ is a straight-chain $C_1$–$C_7$-alkyl and ring A is 1,4-phenylene or trans-1,4-cyclohexylene.

16. The liquid crystalline mixture of claim 1 further comprising at least one compound of the formula:

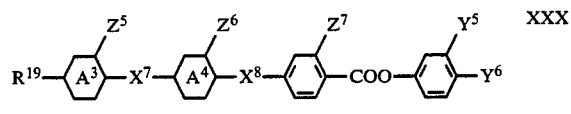 XXX wherein $X^8$ is a single covalent bond or —COO—; $X^7$ is a single covalent bond, —COO—, —CH$_2$CH$_2$— or, when $X^8$ is —COO—, $X^7$ may also be 1,4-phenylene; ring $A^3$ is a benzene ring or trans-1,4-cyclohexylene; ring $A^4$ is a benzene ring or, when $X^8$ is —COO— and $X^7$ is a single covalent bond, —COO— or —CH$_2$CH$_2$—, ring $A^4$ may also be trans-1,4-cyclohexylene; the symbols $Z^5$, $Z^6$ and $Z^7$ are hydrogen or if positioned on a benzene ring which is not linked directly with a further ring via a single covalent bond $Z^5$, $Z^6$ and $Z^7$ may also be halogen, cyano or methyl; $Y^6$ is cyano, nitro, 2,2-dicyanovinyl or, when $Y^5$ is hydrogen, $Y^6$ may also be 2,2-dicyano-1-methyl-vinyl; $Y^5$ is halogen, cyano, $C_1$–$C_3$-alkyl or, when $X^7$ is p-phenylene or $Y^6$ is nitro or at least one of $Z^5$ and $Z^6$ is other than hydrogen, $Y^5$ may also be hydrogen; and $R^{19}$ is $C_1$–$C_{12}$-alkyl or if positioned on a benzene ring, $R^{19}$ may also be $C_1$–$C_{12}$-alkoxy, or a compound of the formula:

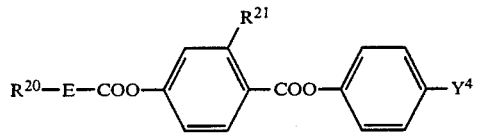

XXXI wherein $R^{21}$ is hydrogen, halogen or cyano; $Y^4$ is cyano, 2,2-dicyanovinyl or 2,2-dicyano-1-methylvinyl; $R^{20}$ and E together are p-$R^{20}$-phenyl, trans-4-$R^{20}$-cyclohexyl, $R'$-$R^{20}$-4-biphenylyl, p-(trans-4-$R^{20}$-cyclohexyl)phenyl, p-(5-$R^{20}$-2-pyrimidinyl)phenyl, p-[2-(p'-$R^{20}$-phenyl)ethyl]-phenyl, p-[2-(trans-4-$R^{20}$-cyclohexyl)ethyl]-phenyl, trans-4-[2-(p-$R^{20}$-phenyl)ethyl]-cyclohexyl or trans-4-[2-trans-4-$R^{20}$-cyclohexyl)ethyl]cyclohexyl; and $R^{20}$ is straight-chain $C_1$–$C_{12}$-alkyl or if positioned on a benzene ring; $R^{20}$ may also be straight-chain $C_1$–$C_{12}$-alkoxy.

17. An electro-optical cell comprising:
  a. two plate means;
  b. a liquid crystal means disposed between the two plate means comprising:
    (i) at least one compound of the formula:

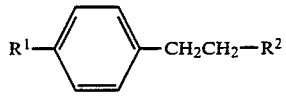

I wherein $R^1$ is alkyl, alkoxy, p-alkylphenyl, p-alkoxyphenyl, trans-4-alkylcyclohexyl, 4'-alkyl-4-biphenylyl, p-(trans-4-alkylcyclohexyl)phenyl, 2-(trans-4-alkylcyclohexyl)ethyl or p-[2-(trans-4-alkylcyclohexyl)ethyl]-phenyl and $R^2$ is trans-4-alkylcyclohexyl; or $R^1$ is trans-4-alkylcyclohexyl and $R^2$ is p-(trans-4-alkylcyclohexyl)phenyl, p-[2-trans-4-alkylcyclohexyl)ethyl]phenyl or 4'-(trans-4-alkylcyclohexyl)-4-biphenylyl; or $R^1$ is p-alkylphenyl and $R^2$ is p-[2-(trans-4-alkylcyclohexyl)ethyl]phenyl; and the alkyl and alkoxy groups in the substituents $R^1$ and $R^2$ are straight-chain groups of 1 to 7 carbon atoms, and;
    (ii) at least one dichroic colouring substance selected from the group of compounds consisting of:

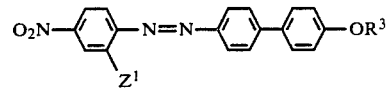

II

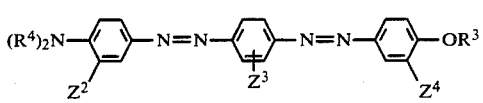

III

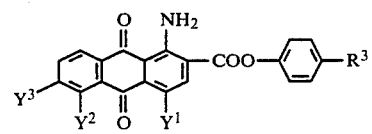

IV

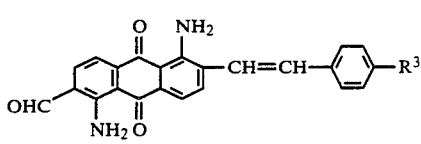

IVa and

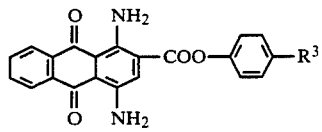

V wherein $R^3$ is straight-chain $C_1$–$C_{12}$-alkyl and $R^4$ is straight-chain $C_1$–$C_4$-alkyl, $Z^1$ is hydrogen or chlorine, one of the symbols $Z^2$, $Z^3$ and $Z^4$ is chlorine and the other two are hydrogen, and $Y^1$ is hydrogen, $Y^2$ is an amino group and $Y^3$ is methyl or $Y^1$ is hydroxy and $Y^2$ and $Y^3$ are hydrogen; and
  c. means for applying an electrical potential to said plate means.

* * * * *